US008041152B2

(12) United States Patent
Taguchi et al.

(10) Patent No.: US 8,041,152 B2
(45) Date of Patent: Oct. 18, 2011

(54) IMAGE RESOLUTION INCREASING METHOD AND APPARATUS

(75) Inventors: Yasunori Taguchi, Kawasaki (JP); Takashi Ida, Kawasaki (JP); Toshimitsu Kaneko, Kawasaki (JP); Nobuyuki Matsumoto, Inagi (JP); Takeshi Mita, Yokohama (JP); Hidenori Takeshima, Ebina (JP); Toshiyuki Ono, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 579 days.

(21) Appl. No.: 12/233,155

(22) Filed: Sep. 18, 2008

(65) Prior Publication Data

US 2009/0161992 A1    Jun. 25, 2009

(30) Foreign Application Priority Data

Dec. 25, 2007    (JP) .................................. 2007-333301

(51) Int. Cl.
 *G06K 9/40*    (2006.01)
(52) U.S. Cl. ....... 382/299; 382/274; 382/275; 358/3.26; 358/3.27
(58) Field of Classification Search .................. 382/260, 382/274, 275, 299
See application file for complete search history.

(56) References Cited

U.S. PATENT DOCUMENTS

| 6,868,193 | B1 * | 3/2005 | Gharbia et al. ................ 382/305 |
| 6,925,593 | B1 * | 8/2005 | Knutson et al. ............... 715/222 |
| 7,110,604 | B2 * | 9/2006 | Olsson ........................... 382/224 |
| 7,222,306 | B2 * | 5/2007 | Kaasila et al. ................. 715/801 |
| 7,397,501 | B2 * | 7/2008 | Afsenius ..................... 348/218.1 |
| 7,613,363 | B2 * | 11/2009 | Platt et al. ...................... 382/299 |
| 7,684,089 | B2 * | 3/2010 | Yamada ....................... 358/3.28 |
| 2007/0269137 | A1 | 11/2007 | Takashi et al. |
| 2008/0107356 | A1 | 5/2008 | Matsumoto et al. |

OTHER PUBLICATIONS

U.S. Appl. No. 12/397,747, filed Mar. 4, 2009, Matsumoto, et al.
U.S. Appl. No. 12/048,925, filed Mar. 14, 2008, Nobuyuki Matsumoto, et al.
U.S. Appl. No. 11/953,370, filed Dec. 10, 2007, unknown.
U.S. Appl. No. 12/026,674, filed Feb. 6, 2008, unknown.
Akira Tanaka, et al., "Digital Image Enlargement Based on Kernel Component Estimation", International Journal of Computing Anticipatory Systems, vol. 15, ISSN 1373-5411 ISBN 2-930396-01-6, 2004, pp. 97-108.

\* cited by examiner

*Primary Examiner* — Yosef Kassa
(74) *Attorney, Agent, or Firm* — Oblon, Spivak, McClelland, Maier & Neustadt, L.L.P.

(57) ABSTRACT

An image resolution increasing method include setting a first block which is included in a low resolution image and is located at a first position, and a second block which is included in a high resolution image and is located at a second position, and setting, as an increasing resolution block of the first block, a third block expressed by a second vector obtained by projecting a first vector representing the second block to a linear manifold as a set of vectors that indicate fourth blocks of the second block size, the fourth blocks becoming the first block due to reduced resolution, in a Euclidean space having, as the number of dimensions, a product of the number of pixels arranged vertically in the second block size and the number of pixels arranged horizontally in the second block size.

20 Claims, 15 Drawing Sheets

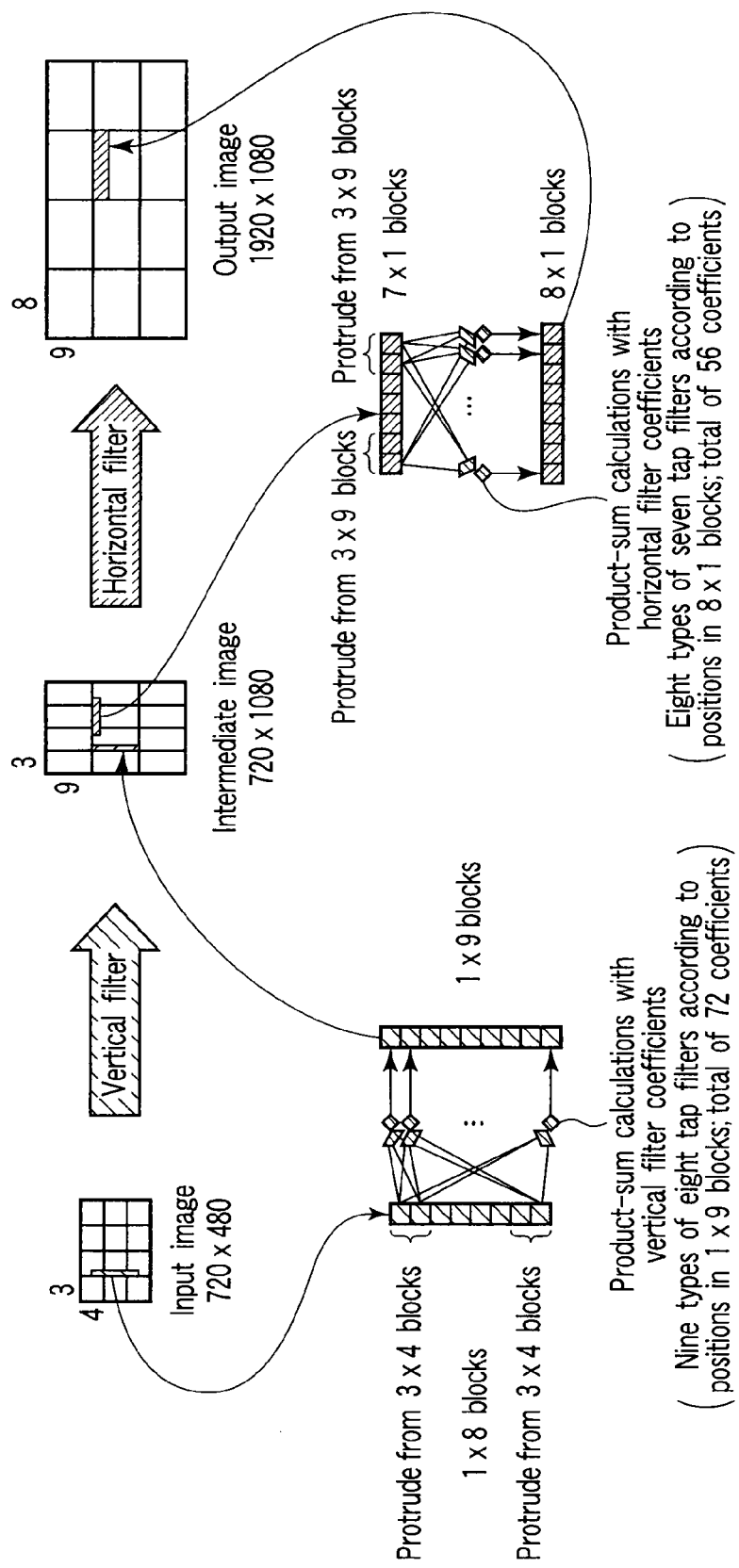
F I G. 15

IMAGE RESOLUTION INCREASING METHOD AND APPARATUS

CROSS-REFERENCE TO RELATED APPLICATIONS

This application is based upon and claims the benefit of priority from prior Japanese Patent Application No. 2007-333301, filed Dec. 25, 2007, the entire contents of which are incorporated herein by reference.

BACKGROUND OF THE INVENTION

1. Field of the Invention

The present invention relates to an image resolution increasing method and apparatus, which convert image data captured by a camera or received by a television into image data of a higher resolution.

2. Description of the Related Art

In recent years, display apparatuses such as televisions, displays, and the like having a large number of pixels have prevailed. An image can be displayed up to its details as the number of pixels of the display apparatus is larger. That is, a high-resolution image can be displayed.

In order to increase the number of pixels, an interpolation manner is popularly used. The interpolation manner can speed up processing but it cannot always obtain a sharp image. In order to obtain a sharper image than the interpolation manner, a method of generating a high-resolution image that satisfies a constraint called a reconstruction constraint is available (for example, see A. Tanaka, H. Imai, and M. Miyakoshi, "Digital Image Enlargement Based on Kernel Component Estimation," International Journal of Computing Anticipatory Systems, vol. 15, pp. 97-108, 2004).

However, the conventional method of generating a high-resolution image that satisfies a reconstruction constraint suffers a problem of high calculation cost. In case of high calculation cost, for example, in a situation that requires increasing resolution so as to display a moving picture on a display apparatus, the processing speed of increasing resolution becomes lower than the playback speed of the moving picture, thus posing a problem of dropping frames.

BRIEF SUMMARY OF THE INVENTION

In accordance with a first aspect of the invention, there is provided an image resolution increasing method, comprising: inputting a low-resolution image having a first size as a size that indicates the numbers of pixels arranged vertically and horizontally; inputting a high-resolution image obtained by increasing in resolution the low-resolution image to a second size by an interpolation manner or a super-resolution manner, the second size being a desired size of a first image finally generated; calculating a first block size corresponding to the first size and a second block size corresponding to the second size in accordance with the first size and the second size; setting a first position of a block of the first block size in the low-resolution image, and a second position of a block of the second block size in the high-resolution image or the first image, the second position corresponding to the first position; setting a first block which is included in the low-resolution image and is located at the first position, and a second block which is included in the high-resolution image and is located at the second position; setting, as an increased resolution block of the first block, a third block expressed by a second vector obtained by projecting a first vector representing the second block to a linear manifold as a set of vectors that indicate fourth blocks of the second block size, the fourth blocks becoming the first block due to reduced resolution, in a Euclidean space having, as the number of dimensions, a product of the number of pixels arranged vertically in the second block size and the number of pixels arranged horizontally in the second block size to obtain a plurality of increased resolution blocks; and generating the first image using at least one of the increased resolution blocks set by changing the first position and the second position.

In accordance with a second aspect of the invention, there is provided an image resolution increasing method, comprising: inputting a low-resolution image having a first size as a size that indicates the numbers of pixels arranged vertically and horizontally; inputting a high-resolution image obtained by increasing in resolution the low-resolution image to a second size by an interpolation manner or a super-resolution manner, the second size being a desired size of a first image finally generated; calculating a first block size corresponding to the first size and a second block size corresponding to the second size in accordance with the first size and the second size; setting a first position of a block of the first block size in the low-resolution image, and a second position corresponding to the first position of the second block size in the high-resolution image or the first image; setting a first block which is included in the low-resolution image and is located at the first position, and a second block which is included in the high-resolution image and is located at the second position; setting, as an increased resolution block of the first block, a third block expressed by a vector corresponding to points on a straight line that passes through two points indicated by a first vector and a second vector, the first vector representing the second block, the second vector being obtained by projecting the first vector to a linear manifold as a set of vectors that indicate fourth blocks of the second block size, the fourth blocks becoming the first block due to reduced resolution, in a Euclidean space having, as the number of dimensions, a product of the number of pixels arranged vertically in the second block size and the number of pixels arranged horizontally in the second block size to obtain a plurality of increased resolution blocks; and generating the first image using at least one of the increased resolution blocks set by changing the first position and the second position.

In accordance with a third aspect of the invention, there is provided an image resolution increasing method, comprising: calculating a first block size corresponding to a first size and a second block size corresponding to a second size in accordance with the first size and the second size, the first size being a size of a low-resolution image and a size that indicates the numbers of pixels arranged vertically and horizontally, the second size being a desired size of a first image finally generated; setting a first position of a block of the first block size in the low-resolution image, and a second position of a block of the second block size in the first image, the second position corresponding to the first position; setting a first block which is included in the low-resolution image and is located at the first position; calculating, using the first block size and the second block size, a first coefficient used to generate a second block of the second block size by an interpolation manner from the first block; calculating, using the first coefficient, the first block size, and the second block size, a second coefficient used to calculate a second vector obtained by projecting a first vector indicating the second block to a linear manifold as a set of vectors that indicate third blocks of the second block size, the third blocks becoming a part of the first block due to reduced resolution, in a Euclidean space having, as the number of dimensions, a product of the number of pixels arranged vertically in the second block size and the number of pixels arranged horizontally in the second block size; calculating the second vector corresponding to a position indicated by the second position from the first block and the second coefficient, setting a fourth block indicated by the second vector to an increased resolution block as a part of the first block to obtain a plurality of increased resolution blocks; and generating the first image using at least one of the increased resolution blocks set by changing the first position and the second position.

In accordance with a fourth aspect of the invention, there is provided an image resolution increasing method, comprising: calculating a first block size corresponding to a first size and a second block size corresponding to a second size in accordance with the first size and the second size, the first size being a size of a low-resolution image and a size that indicates the numbers of pixels arranged vertically and horizontally, the second size being a desired size of a first image finally generated; setting a first position of a block of the first block size in the low-resolution image, and a second position of a block of the second block size in the first image, the second position corresponding to the first position; setting a first block which is included in the low-resolution image and is located at the first position; calculating, using the first block size and the second block size, a first coefficient used to generate a second block of the second block size by an interpolation manner from the first block; calculating, using the first coefficient, the first block size, and the second block size, a second coefficient used to calculate a second vector obtained by projecting a first vector indicating the second block to a linear manifold as a set of vectors that indicate third blocks of the second block size, the third blocks becoming a part of the first block due to reduced resolution, in a Euclidean space having, as the number of dimensions, a product of the number of pixels arranged vertically in the second block size and the number of pixels arranged horizontally in the second block size; calculating the second vector corresponding to a position indicated by the second position from the first block and the second coefficient; setting, as an increased resolution block as a part of the first block, a fourth block expressed by a vector corresponding to points on a straight line that passes through two points indicated by the first vector and the second vector to obtain a plurality of increased resolution blocks; and generating the first image using at least one of the increased resolution blocks set by changing the first position and the second position.

BRIEF DESCRIPTION OF THE SEVERAL VIEWS OF THE DRAWING

FIG. 15 is a view for explaining a state in which resolution increasing is independently applied vertically and horizontally by the image resolution increasing method according to the second embodiment;

DETAILED DESCRIPTION OF THE INVENTION

Figure 1:
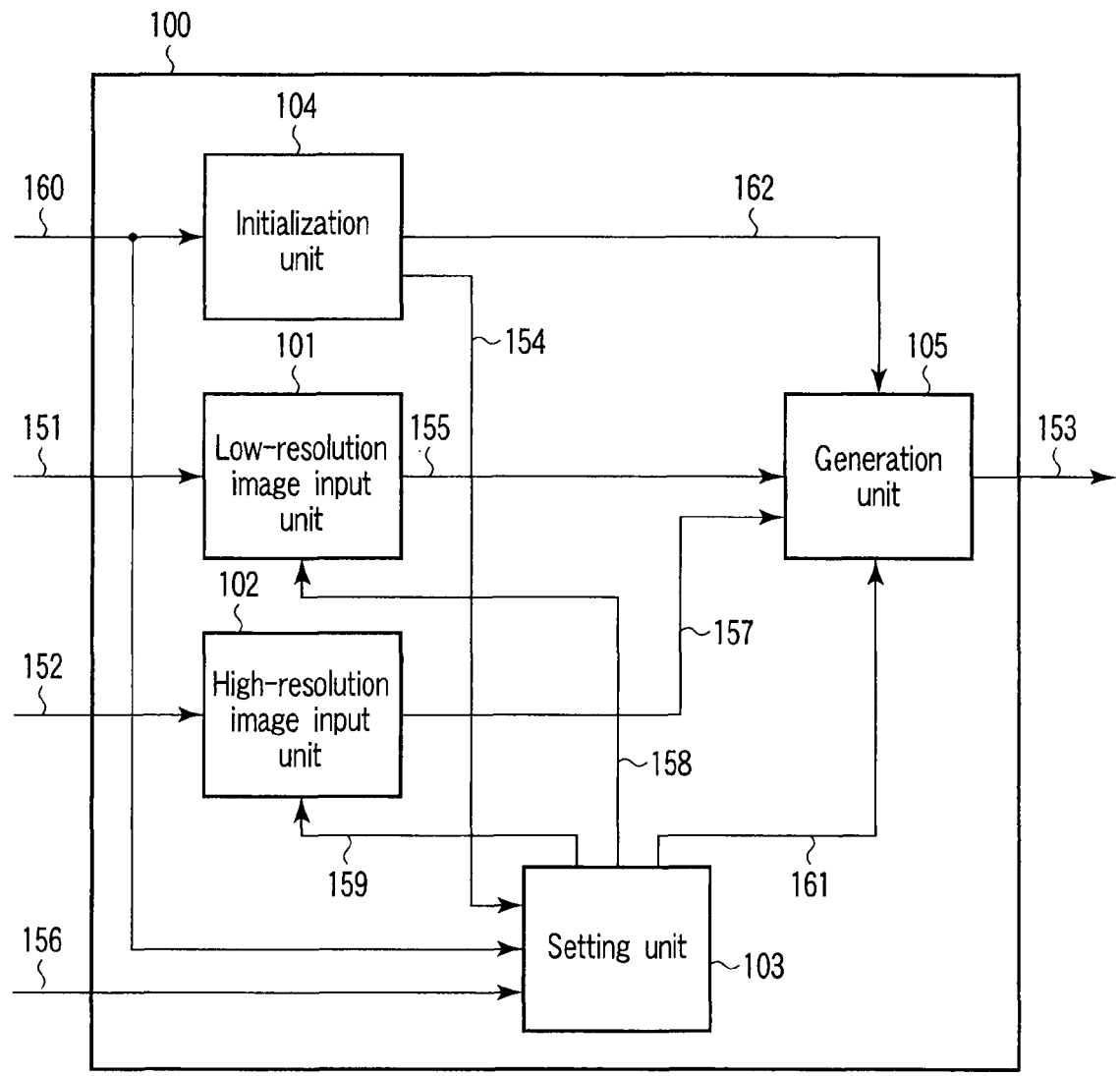
FIG. 1 is a block diagram of an image resolution increasing apparatus according to the first embodiment.

An image resolution increasing method and apparatus according to embodiments will be described in detail hereinafter with reference to the accompanying drawing. Note that components denoted by the same reference numbers perform the same operations, and a repetitive description thereof will be avoided. The embodiments are not limited to those described below, but they may be changed. For example, the embodiments may be changed based on modifications described later or by combining these modifications.

Terms will be explained first.

A digital image is defined by values each having information of a color or luminance at respective positions. A unit having this value is called a pixel, and its value is called a pixel value. For the sake of simplicity, a case will be explained below wherein a pixel has only a value representing luminance as a pixel value. In this case, one pixel has one pixel value. When a pixel has values each having color information as pixel values, for example, the pixel may have values, as pixel values, on an RGB color space that expresses information of colors associated with red, green, and blue on a three-dimensional space. In this case, one pixel has three values associated with red, green, and blue, as pixel values.

In order to increase the resolution of a digital image, the number of pixels needs to be increased. The processing for increasing the number of pixels is called resolution increasing of an image in some cases. Also, enlargement and resolution increasing of an image may be used as the same meaning, and size degradation and reduced resolution of an image may be used as the same meaning.

A rectangular partial image in an image is called a block. In the following description, a block is expressed by a vector defined by arranging pixel values in that block. For the sake of simplicity, a vector may be called a block and vice versa without distinguishing the block and vector from each other.

FIRST EMBODIMENT

An image resolution increasing apparatus of this embodiment will be described below with reference to FIG. 1.

An image resolution increasing apparatus 100 of this embodiment includes a low-resolution image input unit 101, high-resolution image input unit 102, setting unit 103, initialization unit 104, and generation unit 105. The image resolution increasing apparatus 100 generates and outputs an increased resolution image 153 based on image number data 156, size data 160, a low-resolution image 151, and a high-resolution image 152. In the following description, let $w_l$ be the number of pixels (width) horizontally of a low-resolution image (still picture or moving picture) to be increased in resolution, and $h_l$ be the number of pixels (height) arranged vertically. Also, let $w_h$ be the width of an image obtained by increasing in resolution the low-resolution image, and $h_h$ be the height.

The low-resolution image input unit 101 inputs, as a low-resolution image 151, an n-th (n=1, 2, ..., N) low-resolution image (moving picture or still picture) of those to be increased in resolution. The low-resolution image 151 is data that represents pixel values of respective pixels. If a low-resolution image to be increased in resolution is encoded by, e.g., jpeg, mpeg2, or the like, the low-resolution image input unit 101 comprises a codec for decoding the encoded image. The low-resolution image input unit 101 acquires block data 158 set by the setting unit 103, extracts a low-resolution block 155 indicated by the block data 158 from the low-resolution image 151, and passes the low-resolution block 155 to the generation unit 105. The block data 158 is data representing the position of the low-resolution block 155 having a width $c_l$ and height $r_l$ in the low-resolution image 151. This position indicates, for example, the upper left coordinate position of a block. The setting unit 103 designates the block data 158 while shifting its position. More specifically, the setting unit 103 shifts the position by $c_l$ horizontally and $r_l$ vertically. In this way, the low-resolution blocks 155 in the low-resolution image 151 are processed in turn.

The high-resolution image input unit 102 inputs the high-resolution image 152 obtained by increasing in resolution the low-resolution image 151. The high-resolution image 152 is data that represents pixel values of respective pixels of an image having the same size as the increased resolution image 153, which is generated and output by the image resolution increasing apparatus 100, and an image obtained by increasing in resolution the n-th low-resolution image 151 is input as the high-resolution image 152. The resolution increasing method can be implemented by existing interpolation manners, and for example, a bilinear manner, cubic convolution manner, bicubic manner, cubic spline manner, and the like allow high-speed processing. Also, reconstruction-based super-resolution, example learning-based super-resolution, and the like may be used. If the high-resolution image 152 is encoded by, e.g., jpeg, mpeg2, or the like, the high-resolution image input unit 102 comprises a codec for decoding the encoded image. The high-resolution image input unit 102 acquires block data 159 set by the setting unit 103, extracts a high-resolution block 157 indicated by the block data 159 from the high-resolution image 152, and passes the high-resolution block 157 to the generation unit 105. The block data 159 is data which indicates the position of the high-resolution block 157 having a width $c_h$ and height $r_h$ in the high-resolution image 152. This position is, for example, the upper left coordinate position of the block. The setting unit 103 designates the block data 159 at a position corresponding to the block data 158. More specifically, the setting unit 103 shifts the position by $c_h$ horizontally and $r_h$ vertically.

The initialization unit 104 acquires the size data 160, and outputs block size data 154 and generation data 162. The size data 160 is data which represents the size (the number of pixels arranged horizontally, and that arranged vertically) of the low-resolution image 151, and the size of the increased resolution image 153 to be generated. When a low-resolution image to be increased in resolution (moving picture or still picture) is encoded by, e.g., jpeg, mpeg2, or the like, the size data 160 is a part of a header. The block size data 154 is calculated from the input size data 160 ($w_l$, $h_l$, $w_h$, and $h_h$). The block size data 154 is data which represents the size (width $c_l$ and height $r_l$) of a block in the low-resolution image 151, and the size (width $c_h$ and height $r_h$) of a block in the high-resolution image 152 or increased resolution image 153 as processing units for resolution increasing. A method of calculating the block size data 154 ($c_l$, $r_l$, $c_h$, and $r_h$) will be described later in (1-1). The generation data 162 is data required for the generation unit 105, and is calculated from the block size data ($c_l$, $r_l$, $c_h$, and $r_h$). Details of the generation data 162 and its calculation method will be described later in (1-2).

The setting unit 103 acquires the image number data 156, size data 160, and block size data 154, which is calculated by the initialization unit 104. The image number data 156 is data which represents the number N of low-resolution images to be increased in resolution. If a low-resolution image to be increased in resolution is a moving picture, and that moving picture is encoded by, e.g., mpeg2 or the like, the image number data 156 is a part of a header. The setting unit 103 acquires these data, and calculates the block data 158, 159, and 161. The block data 161 is data which represents the position of an increased resolution block having a width $c_h$ and height $r_h$ in the increased resolution image 153. The setting unit 103 designates the block data 161 at a position corresponding to the block data 158. More specifically, the setting unit 103 shifts the position by $c_h$ horizontally and $r_h$ vertically. By associating the block data 158, 159, and 161 with each other, the processing can be done for each image block in place of the entire image. The setting unit 103 checks if all increased resolution blocks in the increased resolution image 153 have been processed. Furthermore, the setting unit 103 checks based on the image number data 156 if all (N images; N frames) of low-resolution images (moving picture frames or still pictures) to be increased in resolution have been processed.

The generation unit 105 generates an increased resolution block in the increased resolution image 153, which is indicated by the block data 161, based on the low-resolution block 155, high-resolution block 157, generation data 162, and block data 161. A method of generating the increased resolution block will be described later in (1-3). The generation unit 105 generates the increased resolution image 153 by generating all increased resolution blocks in the increased resolution image 153.

An example of the operation of the image resolution increasing apparatus 100 shown in FIG. 1 will be described below with reference to FIG. 2.

(Step S201) The image number data 156 is input to the setting unit 103, and the size data 160 is input to the initialization unit 104 and setting unit 103. The initialization unit

104 then calculates the block size data 154 and sends the calculated data to the setting unit 103. Finally, the initialization unit 104 calculates the generation data 162, and sends the calculated data to the generation unit 105.

(Step S202) The low-resolution image input unit 101 receives an n-th image of low-resolution images (moving picture frames or still pictures) to be increased in resolution as the low-resolution image 151.

(Step S203) The high-resolution image input unit 102 receives the high-resolution image 152 obtained by increasing in resolution the low-resolution image 151.

(Step S204) The setting unit 103 sends the block data 158 to the low-resolution image input unit 101, the block data 159 to the high-resolution image input unit 102, and the block data 161 to the generation unit 105. The low-resolution image input unit 101 sends the low-resolution block 155 in the low-resolution image 151, which is indicated by the block data 158, to the generation unit 105. The high-resolution image input unit 102 sends the high-resolution block 157 in the high-resolution image 152, which is indicated by the block data 159, to the generation unit 105. The block data 158 is designated while shifting its position upon repetitively processing step S204. By associating the block data 158, 159, and 161 with each other, the processing is done for each image block in place of the entire image.

(Step S205) The generation unit 105 generates an increased resolution block in the increased resolution image 153 indicated by the block data 161, based on the low-resolution block 155, high-resolution block 157, and generation data 162.

(Step S206) The setting unit 103 checks if all increased resolution blocks in the increased resolution image 153 have been processed. If all the blocks have been processed, the process advances to step S207; otherwise, the process returns to step S204. Step S205 is repeated while changing the block data 158, 159, and 161 controlled by the setting unit 103. As a result of repetition, the generation unit 105 generates and outputs the increased resolution image 153 by generating all increased resolution blocks in the increased resolution image 153. Note that end blocks are hard to receive attention, and are not often important. Hence, these blocks may be generated by a method requiring lower calculation cost.

(Step S207) The setting unit 103 checks based on the image number data 156 if all (N images) of low-resolution images (moving picture frames or still pictures) to be increased in resolution have been processed. If all the images (frames) have been processed, the processing ends; otherwise, the process returns to step S202.

(1-1) Calculation Method of Block Size Data 154 ($c_l$, $r_l$, $c_h$, and $r_h$)

Initialization Unit 104

The initialization unit 104 calculates the height $r_l$ of a low-resolution block and the height $r_h$ of a high-resolution block based on a resolution increasing ratio vertically. The resolution increasing ratio vertically is $h_h/h_l$. This fraction is reduced to an irreducible fraction. The denominator of this irreducible fraction is used as the height $r_l$ of the low-resolution block, and the numerator is used as the height $r_h$ of the high-resolution block. In order to reduce the fraction to the irreducible fraction, for example, a greatest common factor of $h_h$ and $h_l$ is calculated by the Euclidean mutual division, and the numerator and denominator of $h_h/h_l$ are respectively divided by that greatest common factor. The initialization unit 104 calculates the width $c_l$ of the low-resolution block, and the width $c_h$ of the high-resolution block based on a resolution increasing ratio horizontally. The resolution increasing ratio horizontally is $w_h/w_l$. This fraction is reduced to an irreducible fraction. The denominator of this irreducible fraction is used as the width $c_l$ of the low-resolution block, and the numerator is used as the width $c_h$ of the high-resolution block. In order to reduce the fraction to the irreducible fraction, for example, a greatest common factor of $w_h$ and $w_l$ is calculated by the Euclidean mutual division, and the numerator and denominator of $w_h/w_l$ are respectively divided by that greatest common factor.

(1-2) Calculation Method of Generation Data 162

Initialization Unit 104

The process of reduced resolution of a high-resolution block x in a high-resolution image X to a low-resolution block y in a low-resolution image Y is described using a reduced resolution matrix W by:

$$y = Wx$$

where x is a ($c_h r_h$)-dimensional column vector defined by arranging pixel values of pixels of the high-resolution block, y is a ($c_l r_l$)-dimensional column vector defined by arranging pixel values of pixels of the low-resolution block, and W is, for example, equal to a matrix that represents an area average determined by an area ratio of corresponding pixels. In an example of FIG. 3 ($c_l=1$, $r_l=1$, $c_h=4$, and $r_h=4$) in which a 4×4 high-resolution block is reduced in resolution to a 1×1 low-resolution block, the matrix that represents the area average is a 1 (row)×16 (columns) matrix, and all elements of this matrix are "1/16"s. The matrix that represents the area average need not always be adopted as W. For example, a matrix that represents a weighted area average, in which weights become larger toward the center of pixels may be adopted. Alternatively, a matrix in consideration of optical characteristics of a given camera may be adopted. Since the resolution of y is lower than that of x, $c_l r_l < c_h r_h$ holds. A resolution increasing problem is treated as a problem of reconstructing the high-resolution block x which meets a reconstruction constraint given by y=Wx from the input low-resolution block y, and paving that high-resolution block x on the entire high-resolution image X.

The high-resolution block x is one point in a ($c_h r_h$)-dimensional Euclidean space expressed by:

$$R^{c_h r_h}.$$

That is, x is indicated by a ($c_h r_h$)-dimensional vector in this ($c_h r_h$)-dimensional Euclidean space. This ($c_h r_h$)-dimensional Euclidean space expressed by:

$$R^{c_h r_h}$$

is an orthogonal direct sum of R(W*) and N(W). That is, the equation below holds:

$$R^{c_h r_h} = R(W^*) \oplus + N(W)$$

where W* is a conjugate transposed matrix of W. Since W is a real number matrix, W* is a transposed matrix. R(W*) is a range of W* defined by:

$$R(W^*) = \{x | x = W^* y\}.$$

N(W) is a null-space of W defined by:

$$N(W) = \{x | Wx = 0\}$$

where "0" represents the $(c_l r_l)$-dimensional column vector including elements of all "0"s.

⊕ represents an orthogonal direct sum. From the relation of this orthogonal direct sum, an arbitrary element of the Euclidean space expressed by:

$$R^{c_h r_h}$$

can be uniquely decomposed into those of R(W*) and N(W). Therefore, the high-resolution block x can be decomposed into:

$$x = P_{R(W^*)} x + P_{N(W)} x$$

where $$P_{R(W^*)}$$

expresses an orthogonal projection matrix to R(W*), and $$P_{R(W^*)} = W^+ W$$

holds. $W^+$ is a Moore-Penrose generalized inverse matrix, and the matrix size is $(c_h r_h)$ rows×$(c_l r_l)$ columns. $P_{N(W)}$ represents an orthogonal projection matrix to N(W), and $$P_{N(W)} = I - W^+ W$$

holds. I is a unit matrix of $(c_h r_h)$ rows×$(c_h r_h)$ columns. Therefore, the high-resolution block x can be decomposed to:

$$x = W^+ W x + (I - W^+ W) x.$$

x which satisfies the reconstruction constraint y=Wx can be decomposed to:

$$x = W^+ y + (I - W^+ W) x.$$

Figure 3:
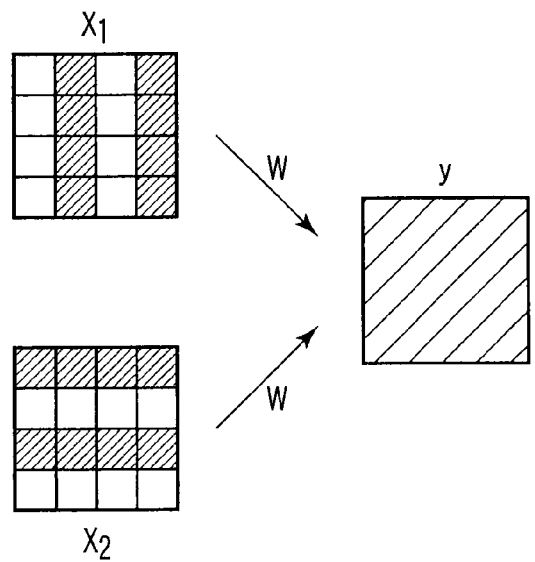
FIG. 3 is a view showing a state in which a high-resolution image is reduced in resolution to a low-resolution image.

The first term of the right-hand side is an R(W*) component of x, and the second term is an N(W) component of x. Therefore, a generalized form, i.e., a generalized solution of the high-resolution block x which satisfies the reconstruction constraint y=Wx can be expressed by:

$$x = W^+ y + (I - W^+ W) z$$

where z is an arbitrary high-resolution block, and is a $(c_h r_h)$-dimensional column vector. The R(W*) component of this generalized solution is uniquely defined. On the other hand, since the N(W) component includes the arbitrary high-resolution block z, and is not uniquely defined, the N(W) component of x is not uniquely defined. Therefore, there are a plurality of "x"s which satisfy the reconstruction constraint, and are not uniquely defined. FIG. 3 shows an example in which high-resolution blocks $x_1$ and $x_2$ are reduced in resolution to an identical low-resolution block y by reduced resolution expressed by the reduced resolution matrix W. In this example, the resolution is reduced to 1/16 (1/4 vertically and horizontally). As can also been seen from FIG. 3, the high-resolution block x which satisfies the reconstruction constraint is not uniquely defined from the low-resolution block y. Hence, in the embodiments, in order to acquire a sharp high-resolution block with low calculation cost, z is calculated fast from y by the interpolation manner, and a high-resolution block $x_p$ is calculated from $z_p$ by:

$$x_p = W^+ y + (I - W^+ W) z_p.$$

Figure 4:
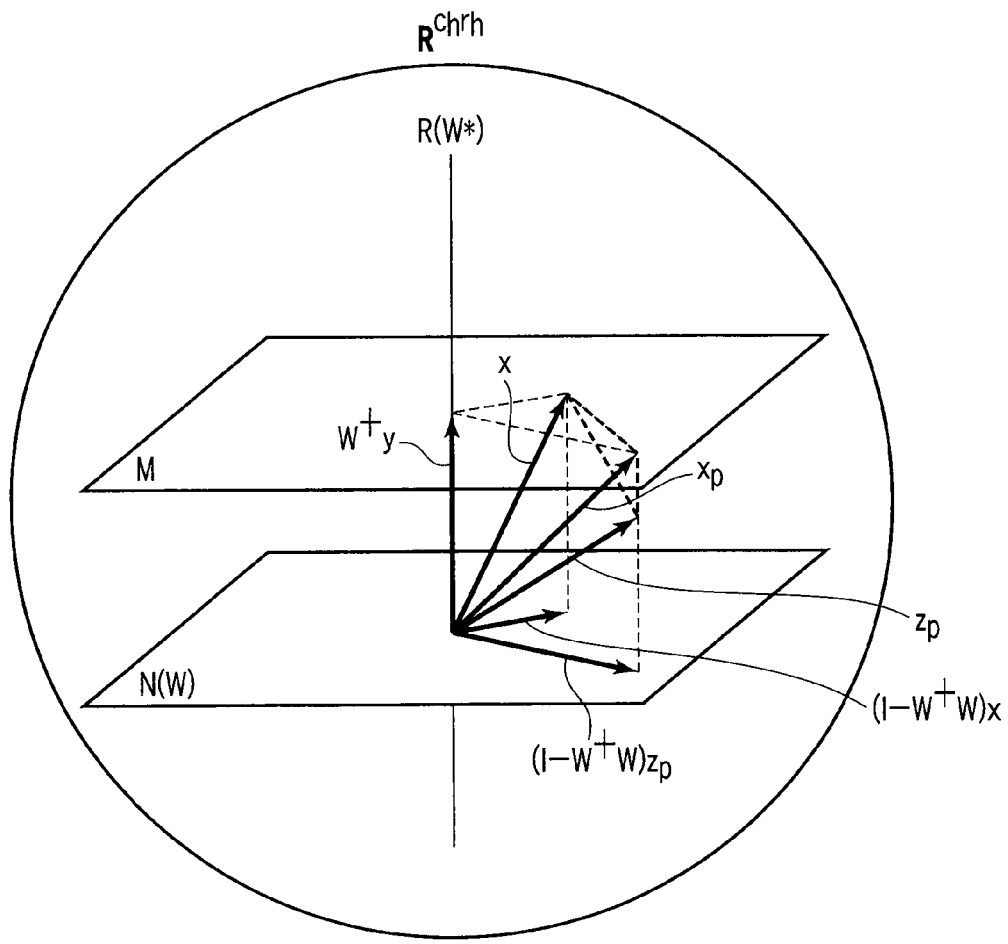
FIG. 4 is a view for explaining the geometric significance of the image resolution increasing method according to the first embodiment.

The first term of the right-hand side is an R(W*) component of $x_p$, and the second term is an N(W) component of $x_p$. The first term (R(W*) component) of this equation $(x_p = W^+ y + (I - W^+ W) z_p)$ corresponds to a case in which a generalized inverse filter described in "Hidemitsu Ogawa, "Reconstruction of Signal and Image [III]-Projection Filters for Optimal Reconstruction-," Journal of IEICE, vol. 71, pp. 739-748, 1988" is applied to resolution increasing of an image for respective blocks. FIG. 4 is a view for explaining the geometric significance of the calculation of $x_p$ from $z_p$. In this example, since $c_h r_h = 3$, $$R^{c_h r_h}$$

is a three-dimensional Euclidean space. Each of $z_p$ and $x_p$ is one point in that three-dimensional Euclidean space expressed by:

$$R^{c_h r_h}.$$

As described above, $$R^{c_h r_h}$$

is the orthogonal direct sum of R(W*) and N(W). FIG. 4 expresses R(W*) by one dimension, and two-dimensionally expresses N(W) as an orthogonal complementary space of R(W*) by two dimensions. The R(W*) component of $x_p$ is defined by the low-resolution block y and the reduced resolution matrix W. The N(W) component of $x_p$ is obtained by orthogonally projecting $z_p$ to N(W). All elements of a linear manifold M parallel to N(W) satisfy the reconstruction constraint y=Wx. The high-resolution block $x_p$ obtained by this embodiment is generated by orthogonally projecting $z_p$ to M, and is an element closest to $z_p$ of those of M.

The generation data 162 is data required for this orthogonal projection. For example, the generation data 162 is data which represents $W^+$ and $I - W^+ W$.

(1-3) Generation Method of Increased Resolution Block in Increased Resolution Image 153

Generation Unit 105

The low-resolution block 155 is data which represents the aforementioned low-resolution block y, and the high-resolution block 157 is data which represents the aforementioned high-resolution block $z_p$ at a position corresponding to the low-resolution block y. The generation data 162 is data representing $W^+$ described above and $I - W^+ W$. From these blocks, the generation unit 105 calculates an increased resolution block $x_p$ in the increased resolution image 153, which is indicated by the block data 161, based on the aforementioned equation $(x_p = W^+ y + (I - W^+ W) z_p)$.

(1-4) Effect of this Embodiment

This embodiment can reduce calculation cost since calculations are made for each block in an image in place of the entire image. In the method of the related art, for example, A. Tanaka, H. Imai, and M. Miyakoshi, "Digital Image Enlargement Based on Kernel Component Estimation," International Journal of Computing Anticipatory Systems, vol. 15, pp. 97-108, 2004, $(w_l h_l + w_h h_h)$ product-sum calculations are required to calculate a pixel value of one pixel in $X_c$ (i.e., to calculate $X_c = K + Y + (I - K^+ K) Z_c$) upon calculating $X_c$ from Y and $Z_c$. On the other hand, in this embodiment, $(c_l r_l + c_h r_h)$ product-sum calculations are required per pixel due to:

$$x_p = W^+ y + (I - W^+ W) z_p.$$

Since $(c_l r_l + c_h r_h) < (w_l h_l + w_h h_h)$, the calculation cost can be reduced. For example, when $w_l = 720$, $h_l = 480$, $w_h = 1920$, and $h_h = 1080$, since $c_l = 3$, $r_l = 4$, $c_h = 8$, and $r_h = 9$, $c_l r_l + c_h r_h = 84$ and $w_l h_l + w_h h_h = 2419200$, thus greatly reducing the calculation volume.

This embodiment can reduce cost required to calculate a generalized inverse matrix since calculations are made for each block in an image in place of the entire image. In the method of the related art, for example, A. Tanaka, H. Imai, and M. Miyakoshi, "Digital Image Enlargement Based on Kernel Component Estimation," International Journal of Computing Anticipatory Systems, vol. 15, pp. 97-108, 2004, a reduced resolution matrix K has a size as large as $w_l h_l$ rows×$w_h h_h$ columns. On the other hand, in this embodiment, the reduced resolution matrix W has a size of $c_l r_l$ rows×$c_h r_h$ columns. The calculation cost of the Moore-Penrose generalized inverse matrix can be reduced since it becomes higher with increasing matrix size, as is known.

Furthermore, this embodiment can reduce the calculation cost since no iterative calculations by linear programming to uniquely define a solution which is not uniquely defined. In the method of the related art, for example, A. Tanaka, H. Imai, and M. Miyakoshi, "Digital Image Enlargement Based on Kernel Component Estimation," International Journal of Computing Anticipatory Systems, vol. 15, pp. 97-108, 2004, iterative calculations by linear programming are required so as to maximize a likelihood based on the assumption that a differential image conforms to the Laplace distribution. On the other hand, since this embodiment does not use any assumption that a differential image conforms to the Laplace distribution, and does not require any iterative calculations by linear programming with high calculation cost, the calculation cost can be reduced accordingly.

In this embodiment, if the process of reduced resolution is given, and is expressed by an equation (y=Wx), the peak signal-to-noise ratio (PSNR) equal to or higher than $z_p$ can be obtained. In order to prove this, let x be a high-resolution block before reduced resolution. For the sake of proof, it suffices to prove that $SSD(x_p)$ of $x_p$ with respect to x becomes equal to or smaller than $SSD(z_p)$ of $z_p$ with respect to x. $SSD(x_p)$ can be calculated by:

$$SSD(x_p) = \|x - x_p\|^2,$$

$$SSD(x_p) = \|W^+y + (I - W^+W)x - W^+y - (I - W^+W)z_p\|^2,$$

$$SSD(x_p) = \|(I - W^+W)(x - z_p)\|^2$$

where $\|x\|$ is a norm of x. $SSD(z_p)$ can be calculated by:

$$SSD(z_p) = \|x - z_p\|^2,$$

$$SSD(z_p) = \|W^+y + (I - W^+w)x - W^+Wz_p - (I - W^+W)z_p\|^2,$$

$$SSD(z_p) = \|W^+y - W^+Wz_p\|^2 + 2\langle W^+y - W^+Wz_p, (I - W^+W)(x - z_p)\rangle + \|(I - W^+W)(x - z_p)\|^2$$

$$SSD(z_p) = \|W^+y - W^+Wz_p\|^2 + \|(I - W^+W)(x - z_p)\|^2$$

where $\langle x, z\rangle$ represents the inner product of x and z. The above calculation exploits the fact that $$\langle W^+y - W^+Wz_p, (I - W^+W)(x - z_p)\rangle = 0$$

holds because $W^+y - W^+Wz_p$ is an element of $R(W^*)$, and $(I - W^+W)(x - z_p)$ is an element of $N(W)$, and $R(W^*)$ and $N(W)$ are orthogonal to each other. Therefore, $SSD(x_p) - SSD(z_p)$ can be calculated by:

$$SSD(x_p) - SSD(z_p) = \|(I - W^+W)(x - z_p)\|^2 - \|W^+y - W^+Wz_p\|^2 - \|(I - W^+W)(x - z_p)\|^2,$$

$$SSD(x_p) - SSD(z_p) = -\|W^+y - W^+Wz_p\|^2.$$

Therefore, $SSD(x_p) - SSD(z_p)$ becomes equal to or smaller than zero. Hence, it can be proved that this embodiment can obtain the PSNR equal to or higher than $z_p$ if the process of reduced resolution is given, and can be expressed by the equation (y=Wx).

(1-5) First Modification

Modification of Generation Method of High-Resolution Block

In this embodiment, the high-resolution block $x_p$ which satisfies the reconstruction constraint is calculated by the equation ($x_p = W^+y + (I - W^+W)z_p$). By contrast, a high-resolution block which strictly does not satisfy the reconstruction constraint may be calculated. For example, the high-resolution block $x_p$ may be calculated by:

$$x_p = \alpha W^+y + (I - \alpha W^+W)z_p.$$

This equation expresses a straight line that passes through $z_p$ and $W^+y + (I - W^+W)z_p$. If $\alpha = 0$, the high-resolution block $x_p$ equals $z_p$. If $\alpha = 1$, the high-resolution block $x_p$ is given by $W^+y + (I - W^+W)z_p$. If $\alpha$ assumes a value between 0 and 1, the high-resolution block $x_p$ becomes an interpolated point between $z_p$ and $W^+y + (I - W^+W)z_p$. Obtaining the interpolated point may often improve the subjective image quality as compared with $W^+y + (I - W^+W)z_p$. Because, $W^+y + (I - W^+W)z_p$ often generates block noise like in resolution increasing using the nearest neighbor manner. However, by calculating an interpolated point, that block noise can be eliminated. Although SSD cannot improve, jagginess of edges can be reduced. In order to attain ×2 resolution increasing vertically and horizontally, letting W be:

$$W = (\tfrac{1}{4}\ \tfrac{1}{4}\ \tfrac{1}{4}\ \tfrac{1}{4}).$$

we have:

$$W^+ = (1\ 1\ 1\ 1)^T.$$

Hence, $W^+y$ is obtained by increasing in resolution y by the nearest neighbor manner. Note that T in this equation represents transposition of a matrix. As can be seen from FIG. 4, since the resolution increasing given by ($x_p = W^+y + (I - W^+W)z_p$) is conversion that replaces the $R(W^*)$ component of $z_p$ by $W^+y$, it may generate block noise like in resolution increasing using the nearest neighbor manner. If an interpolated point with $z_p$ generated by another method capable of generating a smooth image is calculated, that block noise can be eliminated.

Alternatively, in place of the high-resolution block that strictly satisfies the reconstruction constraint, a high-resolution block that minimizes:

$$\|y - Wx\|^2 + \beta\|Dx\|^2$$

where D is a regularized matrix which has an arbitrary number of rows, and $c_h r_h$ columns, and $\beta$ is a regularization parameter may be calculated. This high-resolution block $x_p$ can be calculated by:

$$x_p = (W^TW + \beta D^TD)^{-1}W^Ty + (I - W^+W)z_p$$

where −1 indicates an inverse matrix of the matrix. If $\beta$ is positive, and D for which $\|Dx\|^2$ is smaller as x is flatter is used, a high-resolution block flatter than that which strictly satisfies the reconstruction constraint is calculated. In this way, when an image includes noise, the noise can often be prevented from being emphasized.

Alternatively, by combining them, a high-resolution block may be calculated by:

$$x_p = \alpha(W^TW + \beta D^TD)^{-1}W^Ty + (I - \alpha W^+W)z_p.$$

As a result, both block noise and noise emphasis can often be eliminated. Even when α and β, or α or β are or is added, the calculation volume remains the same as that before addition.

(1-6) Second Modification

Addition of Emphasis Unit 501

Figure 2:
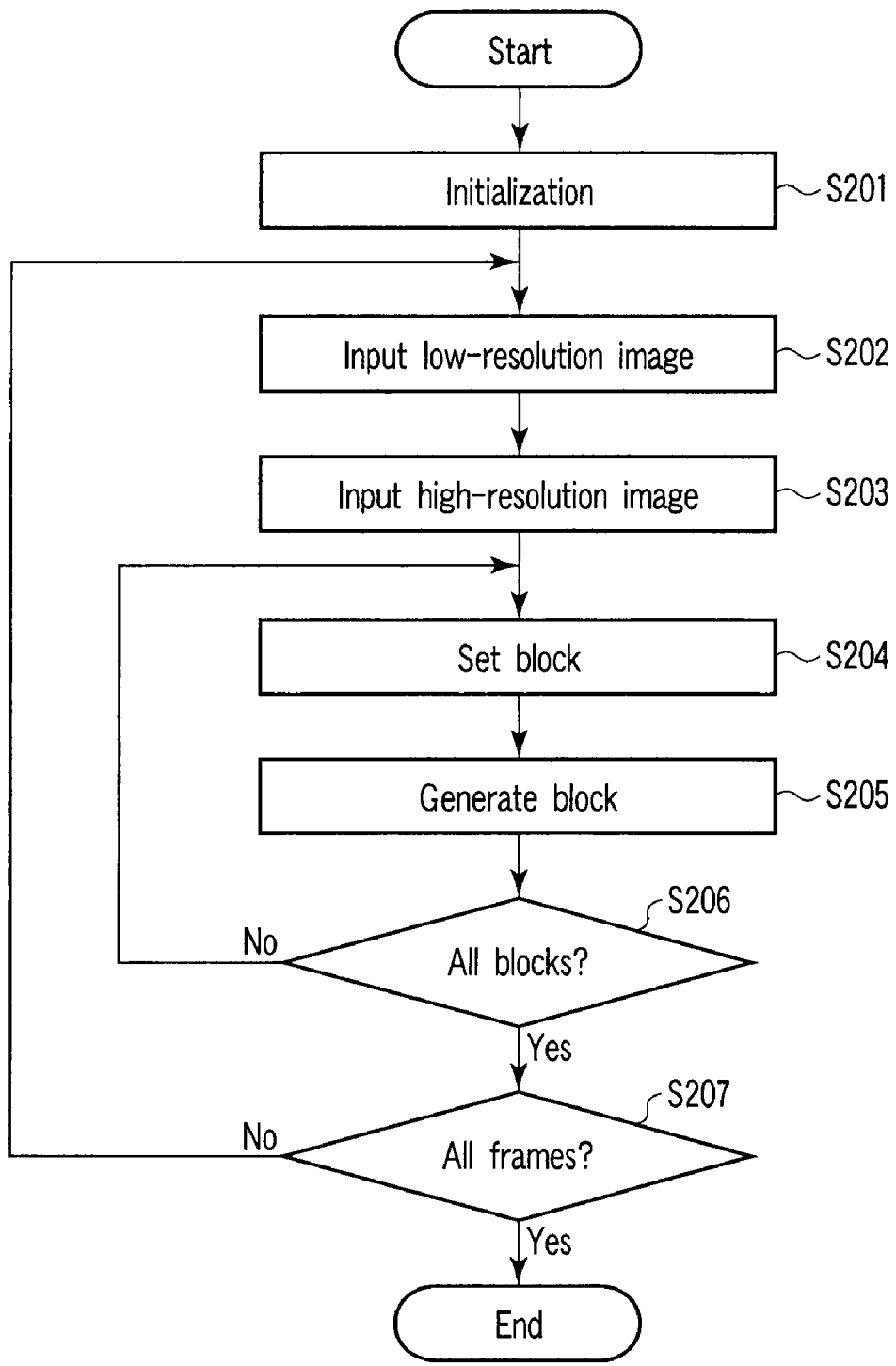
FIG. 2 is a flowchart showing an example of the operation of the image resolution increasing apparatus shown in FIG. 1.
Figure 5:
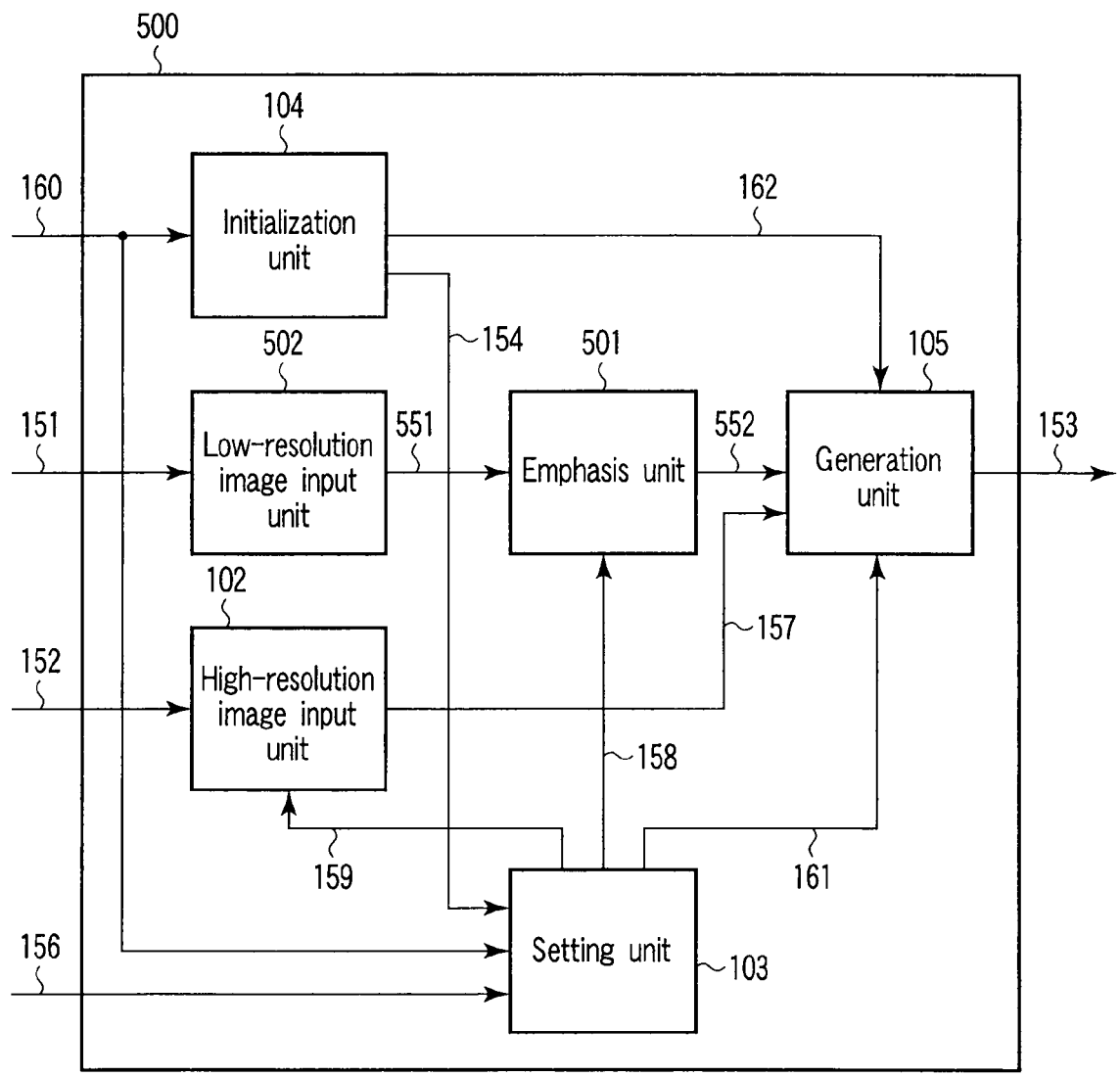
FIG. 5 is a block diagram of an image resolution increasing apparatus according to the second modification of the first embodiment.

In the above embodiment, the arrangement is shown in FIG. 1, and the sequence of the processing is shown in FIG. 2. By contrast, in this modification, the arrangement is changed to FIG. 5, and the sequence of the processing is changed to FIG. 6. Only changes will be explained. In this modification, step S601 is added to the sequence of the processing, and an emphasis unit 501 and low-resolution image input unit 502 are added in place of the low-resolution image input unit 101 in the arrangement.

The low-resolution image input unit 502 inputs the same image as the low-resolution image 151 in the above embodiment as an input, and normally outputs the low-resolution image 151 to the emphasis unit 501 as image data 551. When the low-resolution image 151 is encoded by, e.g., jpeg, mpeg2, or the like, the low-resolution image input unit 502 decodes the low-resolution image 151, and outputs the image data 551 to the emphasis unit 501.

The emphasis unit 501 receives the image data 551 from the low-resolution image input unit 502, and applies emphasis processing to this image data 551. Also, the emphasis unit 501 receives the block data 158 from the setting unit 103, and passes a block 552 as an emphasized block, which is indicated by the block data 158, to the generation unit 105. As the emphasis processing, for example, an unsharp mask or Laplacian filter is applied.

Figure 6:
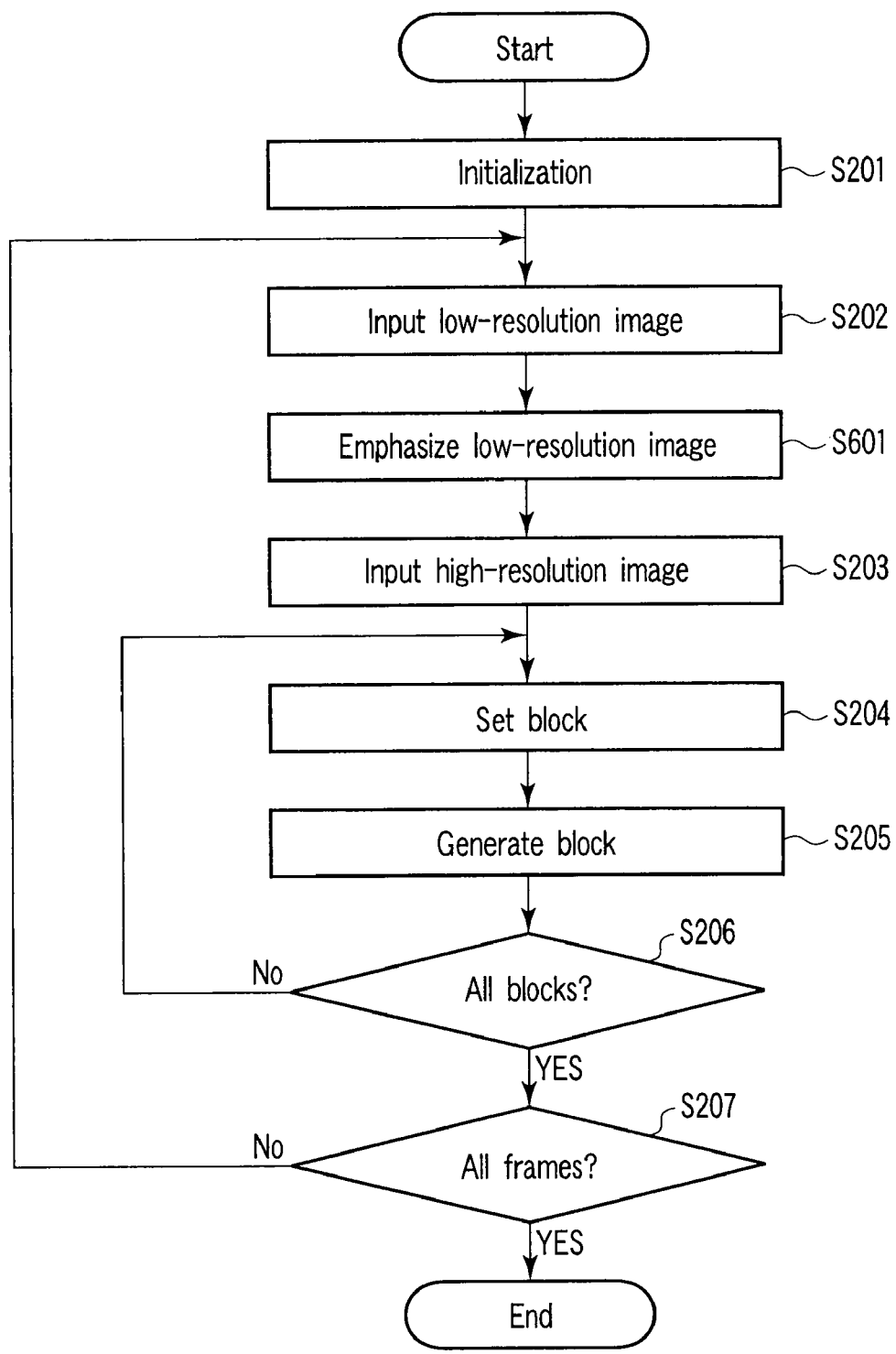
FIG. 6 is a flowchart showing an example of the operation of the image resolution increasing apparatus shown in FIG. 5.

In an example of the operation shown in FIG. 6, only step S601 is different from FIG. 2. In step S601, an emphasized image obtained by applying the emphasis processing to the low-resolution image 151 is generated.

In step S204, the setting unit 103 sends the block data 158 to the emphasis unit 501 in this modification in place of the low-resolution image input unit 101. Also, the emphasis unit 501 sends a block in the emphasized image, which is indicated by the block data 158, to the generation unit 105 in this modification instead of the operation of the above embodiment, in which the low-resolution image input unit 101 sends the low-resolution block 155 in the low-resolution image 151, which is indicated by the block data 158, to the generation unit 105.

In this modification, a low-resolution image is emphasized, and an increased resolution image which becomes an emphasized low-resolution image if it is reduced in resolution is generated. In this way, a sharper increased resolution image can be generated.

(1-7) Third Modification

Modification Associated with Reduced Resolution Matrix W

In the above embodiment, the initialization unit 104 calculates the reduced resolution matrix W. By contrast, in this modification, if the resolution increasing ratio is determined, the initialization unit 104 may receive W from outside the image resolution increasing apparatus 100. Only changes in such case will be explained. In this case, for example, a wire connection for inputting W may be added to the initialization unit 104 in FIG. 1. A block diagram thereof will be omitted. As the sequence of the processing, upon calculation of the generation data 162 by the initialization unit 104 in step S201, input W is used in place of calculating W. In this manner, the calculation cost of W can be reduced.

(1-8) Fourth Modification

Another Modification Associated with Reduced Resolution Matrix W

In the above embodiment, the initialization unit 104 calculates the reduced resolution matrix W. By contrast, W may be stored in the initialization unit 104. For example, W is calculated in advance, and the initialization unit 104 stores W. Only changes in this case will be explained. In this case, as the sequence of the processing, upon calculation of the generation data 162 by the initialization unit 104 in step S201, W stored in advance is used in place of calculating W. In this manner, the calculation cost upon calculating W can be reduced. The generation data 162 may be stored in place of the reduced resolution matrix W. In this case, the initialization unit 104 may store the generation data 162 or the generation unit 105 may store it. When the generation unit 105 stores the generation data 162, the calculation cost upon calculating the generation data 162 by the initialization unit 104 can be reduced. Also, the need for sending the generation data 162 to the generation unit 105 can be obviated.

(1-9) Fifth Modification

Modification Under Assumption of Another Process of Reduced Resolution

In this embodiment, the process of reduced resolution is given by:

$$y=Wx.$$

By contrast, in consideration of additive noise, the process of reduced resolution may be expressed by:

$$y=Wx+n$$

where n is a $(c_j r_j)$-dimensional column vector which represents a block of additive noise. Let Q be a correlation matrix of $\{n\}$. That is, Q is defined by:

$$Q=E_n(n \otimes \overline{n})$$

where $E_n$ is an average associated with n. Since n is a real number vector, we have:

$$Q=E_n(nn^T)$$

where $n^T$ is a transposed vector of n. In case of consideration of additive noise, a high-resolution block $x_p$ is calculated by:

$$x_p=V^+W^*U^+y+(I-W^+W)z_p$$

where U and V are matrices, which are respectively defined by:

$$U=WW^*+Q,$$

$$V=W^*U^+W.$$

The first term (R(W*) component) of an equation ($x_p=V^+W^*U^+y+(I-W^+W)z_p$) is obtained by applying a projection filter described in "Hidemitsu Ogawa, "Reconstruction of Signal and Image [III]—Projection Filters for Optimal Reconstruction—," Journal of IEICE, vol. 71, pp. 739-748, 1988" to resolution increasing of an image for respective blocks. Since the projection filter minimizes the average of noise in R(W*), the first term (R(W*) component) of the equation ($x_p=V^+W^*U^+y+(I-W^+W)z_p$) is the best approximation in R(W*). By merely applying the projection filter to resolution increasing of an image for respective blocks, only the R(W*) component is estimated. By contrast, in this modification, since the N(W) component is also estimated by the second term of the equation $(x_p=V^+W^*U^+y+(I-W^+W)z_p)$, a sharper image can be obtained than a case in which the projection filter is applied to resolution increasing of an image for respective blocks. To attain this change, the initialization unit 104 need only replace the generation data 162 by data that expresses $V^+W^*U^+$ and $I-W^+W$ above. Note that when R(W) matches $$R^{c/r_l}$$

the projection filter matches a generalized inverse filter. When there is no additive noise, Q becomes a matrix having only zero as elements, and the projection filter matches a generalized inverse filter. Conversely, the fifth modification is effective when R(W) does not match $$R^{c/r_l}.$$

(1-10) Sixth Modification

Modification Under Assumption of Still Another Process of Reduced Resolution

Figure 7:
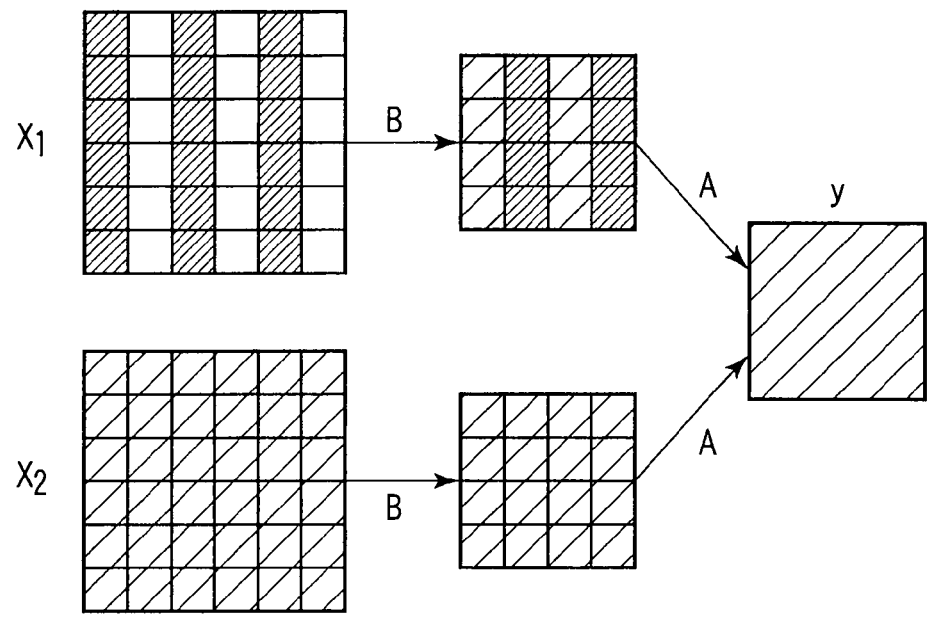
FIG. 7 is a view showing an example of a state in which a high-resolution image is reduced in resolution to a low-resolution image according to the sixth modification of the first embodiment.

The above embodiment adopts, as the reconstruction constraint, the equation (y=Wx) that expresses the process of reduced resolution of a $c_h \times r_h$ high-resolution block x to a $c_l \times r_l$ low-resolution block. By contrast, an equation that expresses the process of reduced resolution of a $(c_h+b) \times (r_h+b)$ high resolution block x to a $c_l \times r_l$ low-resolution block y may be adopted as the reconstruction constraint. The process of reduced resolution (reconstruction constraint) in this case is given by:

$$y=ABx$$

where a high-resolution block x is a $((c_h+b)(r_h+b))$-dimensional column vector, B is a matrix of $c_h r_h$ rows×$(c_h+b)(r_h+b)$ columns, and A is a matrix of $c_l r_l$ rows×$c_h r_h$ columns. The matrix B represents a state in which the high-resolution block x blurs, and the matrix A represents a state in which a high-resolution block Bx is reduced in resolution by an area average matrix. FIG. 7 shows an example of the process of reduced resolution (reconstruction constraint) in this case. In this example, b=2, $c_h$=4, $r_h$=4, $c_l$=1, and $r_l$=1.
If we have:

$$W=AB,$$

the process of reduced resolution (reconstruction constraint) is given by:

$$y=Wx.$$

Figure 8:
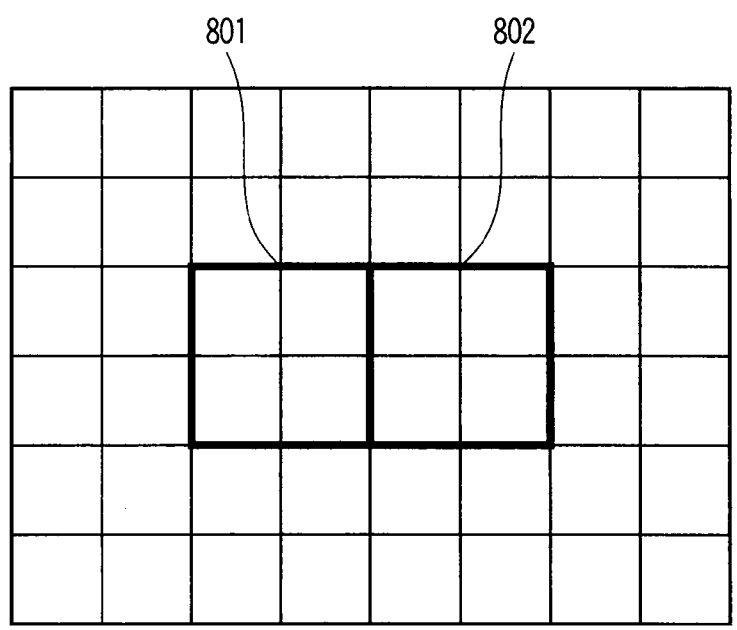
FIG. 8 is a view for explaining the positional relationship between low-resolution blocks in a low-resolution image.
Figure 9:
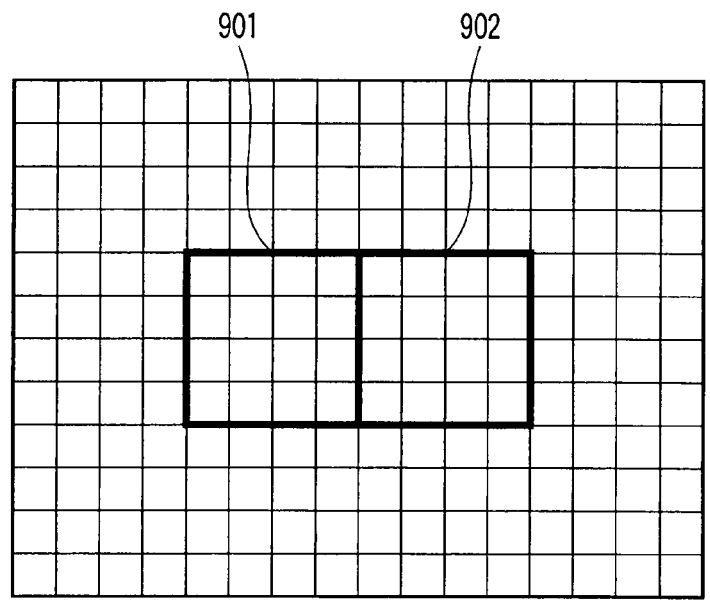
FIG. 9 is a view for explaining the positional relationship between high-resolution blocks in a high-resolution image.
Figure 10:
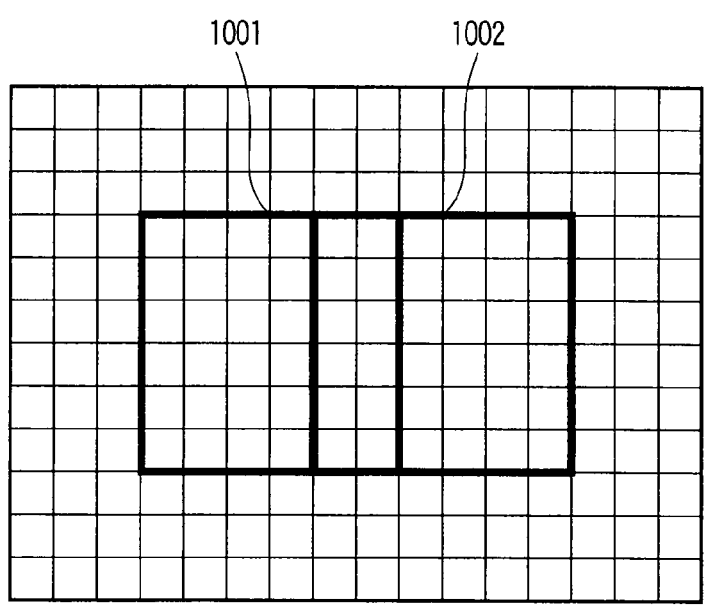
FIG. 10 is a view for explaining the positional relationship between high-resolution blocks in a high-resolution image upon application of the sixth modification of the first embodiment.

Hence, the problem can be handled using the same equation as that when this change is not applied. Therefore, to attain this change, the initialization unit 104 need only substitute the generation data 162 by data which represents $W^+$ based on new W and $I-W^+W$. Note that the block sizes of the high-resolution block x and low-resolution block y are different, and the reduced resolution matrix W has a different size. A detailed description will be given taking a case of ×2 resolution increasing vertically and horizontally as an example. When this modification is not applied, for example, neighboring high-resolution blocks 901 and 902 of a high-resolution image shown in FIG. 9 are generated from neighboring low-resolution blocks 801 and 802 of a low-resolution image shown in FIG. 8, respectively. On the other hand, when this modification is applied to have b=2, overlapping high-resolution blocks 1001 and 1002 of a high-resolution image shown in FIG. 10 are generated from the neighboring low-resolution blocks 801 and 802 of the low-resolution image shown in FIG. 8, respectively. Therefore, to attain this change, the setting unit 103 needs to change the block data 159 and 161 to be controlled. The high-resolution block 157 changes accordingly. The generation unit 105 may be changed to adopt average values for the overlapping part of the high-resolution blocks 1001 and 1002. Upon further considering additive noise, the modification of (1-8) may be applied.

(1-11) Use Example of this Embodiment

Upon implementing resolution increasing vertically and horizontally, respectively, the calculation cost can be reduced more when the resolution increasing is applied vertically only, and is then applied horizontally only. This is because the size of the reduced resolution matrix W used when the resolution increasing is applied independently vertically and horizontally is smaller than that used when the resolution increasing is applied simultaneously vertically and horizontally, and the cost for the calculation of $W^+$ and that of $(x_p=W^+y+(I-W^+W)z_p)$ of the independent application is smaller.

SECOND EMBODIMENT

An image resolution increasing apparatus of this embodiment will be described below with reference to FIG. 11.

An image resolution increasing apparatus 1100 of this embodiment includes an initialization unit 1101, interpolation coefficient initialization unit 1102, coefficient calculation unit 1103, setting unit 1104, low-resolution image input unit 1105, and generation unit 1106. The image resolution increasing apparatus 1100 generates and outputs an increased resolution image 1155 based on size data 160 and a low-resolution image 151.

The initialization unit 1101 acquires size data 160, and outputs block size data 154.

Figure 13:
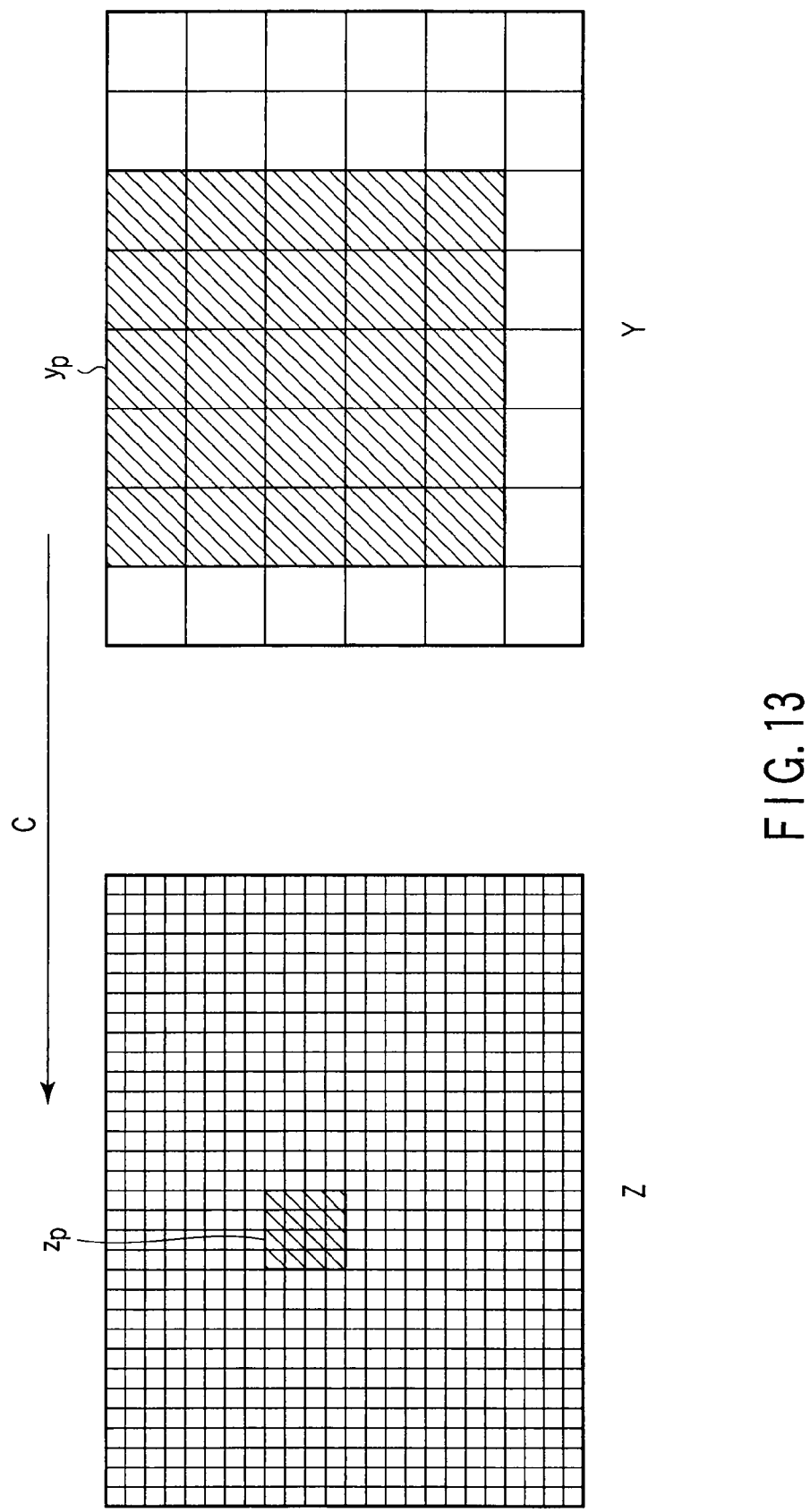
FIG. 13 is a view for explaining the relationship between $y_p$ and $z_p$.

The interpolation coefficient initialization unit 1102 acquires the block size data 154, initializes that block size data 154, and calculates interpolation coefficient data 1151. The interpolation coefficient data 1151 is data which represents coefficients used upon calculating a $c_h \times r_h$ high-resolution block $z_p$ from a $(c_l+i) \times (r_l+i)$ low-resolution block $y_p$ by an interpolation block, and is denoted by reference symbol C, as will be described later. i is a value indicating how many surrounding pixels are to be used in that interpolation manner so as to interpolate a pixel. For example, when the interpolation manner is a cubic convolution manner, i=4, and when it is a bilinear manner, i=2. It is called an interpolation coefficient matrix and is represented by C.

$$z_p=Cy_p$$

where the high-resolution block $z_p$ is a $(c_h r_h)$-dimensional column vector, a low-resolution block $y_p$ is a $((c_l+i)(r_l+i))$-dimensional column vector, and the interpolation coefficient matrix C is a matrix of $c_h r_h$ rows×$(c_l+i)(r_l+i)$ columns. FIG. 13 is a view for explaining the relationship between $y_p$ and $z_p$. As can be seen from FIG. 13, $y_p$ represents a part broader than that of an object represented by $z_p$. $y_p$ is a low-resolution block required to generate $z_p$ by the interpolation manner. In the first embodiment, since the high-resolution image 152 is input, the high-resolution block 157 ($z_p$) can be obtained. On the other hand, in this embodiment, no high-resolution image 152 is input. This embodiment calculates $x_p$ obtained under the assumption that $z_p$ corresponding to the high-resolution block 157 in the first embodiment is generated based on $y_p$ and the interpolation manner. Upon calculation of this $x_p$, $x_p$ is directly calculated without the intervention of $z_p$. The reason why the calculation of z is not intervened is to reduce the calculation volume. The interpolation coefficient matrix C is required to directly calculate $x_p$.

The coefficient calculation unit 1103 acquires the interpolation coefficient data 1151 and block size data 154, and calculates coefficient data 1152. The coefficient data 1152 is required to generate the $c_h \times r_h$ increased resolution block $x_p$ from the $(c_l+i) \times (r_l+i)$ low-resolution block $y_p$, and is a coefficient matrix T (described later) calculated based on W and C above. T is calculated, for example, by:

$$T = S + (I - W^+ W)C$$

where S is a matrix which satisfies $Sy_p = W^+ y$ and has as its elements, the elements of $W^+$ and zero. For example, when both $c_l$ and $r_l$ are "1", $S = [0 \; W^+ \; 0]$. $[0 \; W^+ \; 0]$ is a matrix obtained by coupling zero matrices with the same size to the right and left sides of $W^+$.

The setting unit 1104 acquires image number data 156 and the block size data 154, and sets block data 1153 and 161. The block data 1153 is data indicating the position of a low-resolution block 1154 having a width $c_l+i$ and height $r_l+i$ in the low-resolution image 151. The block data 161 is data indicating the position of an increased resolution block having a width $c_h$ and height $r_h$ in the increased resolution image 1155. The block data 161 is designated at a position corresponding to the block data 1153.

The low-resolution image input unit 1105 acquires the low-resolution image 151 and block data 1153, and generates the low-resolution block 1154 in the low-resolution image 151, which is indicated by the block data 1153. The block data 1153 is designated while shifting its position. More specifically, the position is shifted by $c_l$ horizontally and $r_l$ vertically. In this way, the low-resolution blocks 1154 in the low-resolution image 151 are processed in turn. If i is positive, the low-resolution blocks 1154 overlap each other. When a low-resolution image to be increased in resolution (moving picture frames or still pictures) is encoded by, e.g., jpeg, mpeg2, or the like, the low-resolution image input unit 1105 comprises a codec for decoding the encoded image.

The generation unit 1106 generates an increased resolution block in the increased resolution image 1155, which is indicated by the block data 161, based on the low-resolution block 1154 in the low-resolution image 151 and the coefficient data 1152. The increased resolution block $x_p$ in the increased resolution image 1155 is generated based on the low-resolution block $y_p$ and the coefficient matrix T by:

$$x_p = T y_p.$$

This $x_p$ satisfies:

$$x_p = W^+ y + (I - W^+ W) C y_p.$$

Figure 14:
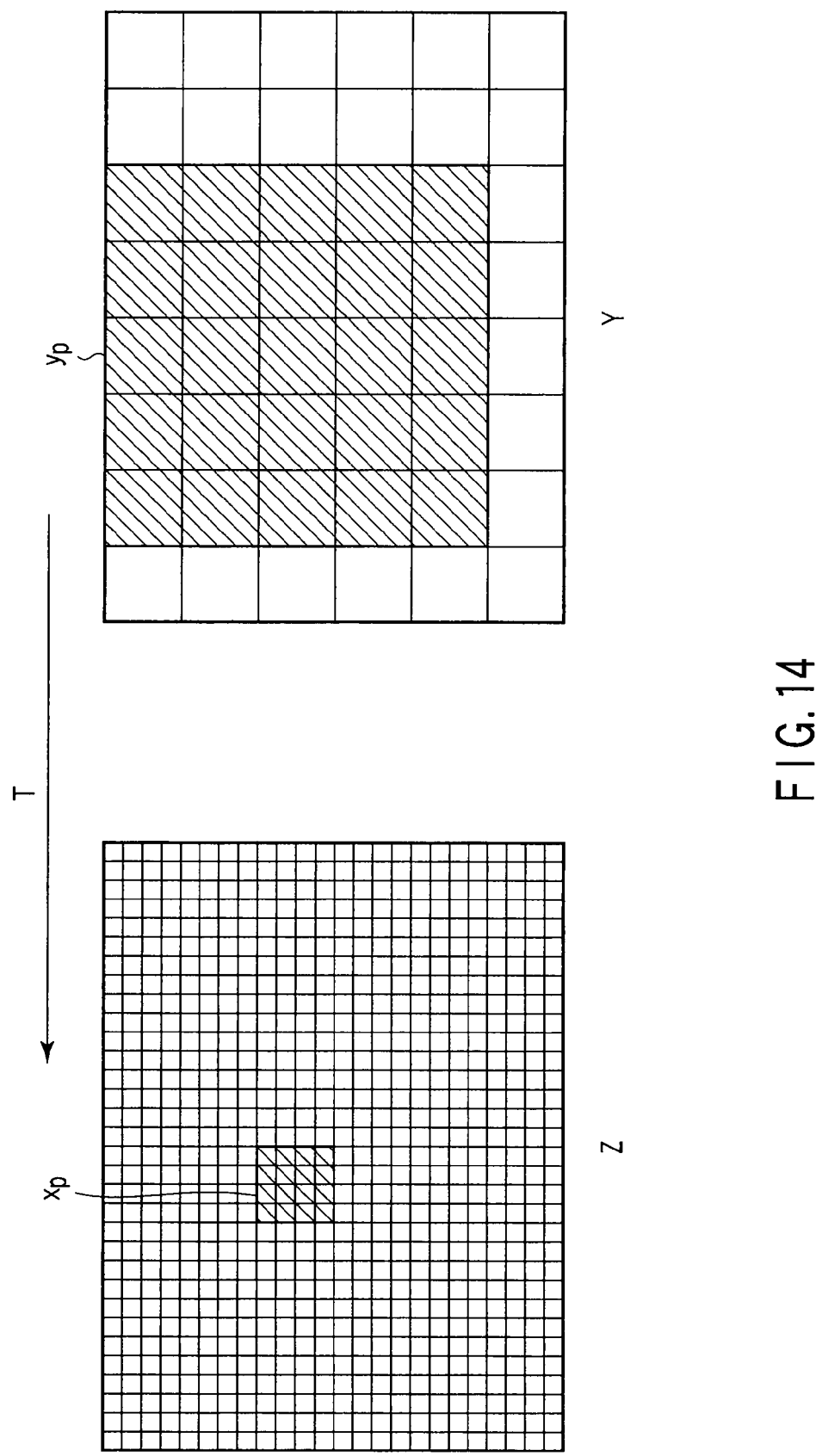
FIG. 14 is a view for explaining the relationship between $y_p$ and $x_p$.

Therefore, if an equation $(z_p = C y_p)$ holds for the high-resolution block $z_p$ of the high-resolution image input in the first embodiment, the second embodiment can obtain the same increased resolution block x as in the first embodiment. Even when the equation $(z_p = C y_p)$ does not hold for the high-resolution block $z_p$ of the high-resolution image, the proof in (1-4) does not assume anything about $z_p$. Hence, if the process of reduced resolution is given by the equation (y=Wx), SSD($x_p$) of $x_p$ with respect to x becomes equal to or smaller than SSD($C y_p$) of the high-resolution block $C y_p$ obtained by the interpolation manner with respect to x. FIG. 14 is a view for explaining the relationship between $y_p$ and $x_p$. $y_p$ obviously represent a portion wider than the object portion represented by $x_p$. $y_p$ is a low-resolution block required to generate $x_p$ using the coefficient matrix T of this embodiment. $x_p$ is directly calculated from $y_p$ and T without any intervention of the calculation of $z_p$.

An example of the operation of the image resolution increasing apparatus 1100 shown in FIG. 11 will be described below with reference to FIG. 12.

(S1201) The image number data 156 is input to the setting unit 1104, and the size data 160 is input to the initialization unit 1101. The initialization unit 1101 calculates the block size data 154, and sends it to the interpolation coefficient initialization unit 1102, coefficient calculation unit 1103, and setting unit 1104.

(S1202) The interpolation coefficient initialization unit 1102 initializes the block size data 154 to generate the interpolation coefficient data 1151, and sends it to the coefficient calculation unit 1103.

(S1203) The coefficient calculation unit 1103 calculates the coefficient data 1152 based on the interpolation coefficient data 1151 and block size data 154, and sends it to the generation unit 1106.

(S1204) The low-resolution image input unit 1105 receives the n-th image (n=1, 2, ..., N) of low-resolution images to be increased in resolution (moving picture frames or still pictures) as the low-resolution image 151.

(S1205) The setting unit 1104 sends the block data 1153 to the low-resolution image input unit 1105, and the block data 161 to the generation unit 1106. The low-resolution image input unit 1105 sends the low-resolution block 1154 in the low-resolution image 151, which is indicated by the block data 1153, to the generation unit 1106. The block data 1153 is designated while shifting its position upon repetitively processing step S1205. More specifically, the position is shifted by $c_l$ horizontally and $r_l$ vertically. In this way, the low-resolution blocks 1154 in the low-resolution image 151 are processed in turn. If i is positive, the low-resolution blocks 1154 overlap each other. The position of the block data 161 is shifted by $c_h$ horizontally and $r_h$ vertically in practice. By associating the block data 1153 and 161 with each other, the processing is done for each image block in place of the entire image.

(S1206) The generation unit 1106 generates an increased resolution block in the increased resolution image 1155, which is indicated by the block data 161, based on the high-resolution block 1154 and coefficient data 1152.

(S1207) The setting unit 1104 checks if all increased resolution blocks in the increased resolution image 1155 have been processed. If all the blocks have been processed, the process advances to step S1208; otherwise, the process returns to step S1205. Step S1206 is repeated while the setting unit 1104 changes the block data 1153 and 161 to be controlled. As a result of this repetition, the generation unit 1106 generates and outputs the increased resolution image 1155 by generating all increased resolution blocks in the increased resolution image 1155. Note that end blocks are hard to receive attention, and are often not important. Hence, these blocks may be generated by a method requiring lower calculation cost.

(S1208) The setting unit 1104 checks based on the image number data 156 if all (N) low-resolution images to be increased in resolution (moving picture frames or still pictures) have been processed. If all the images have been processed, the processing ends; otherwise, the process returns to step S1204.

(2-1) Effect of this Embodiment

This embodiment requires the calculation cost fewer than the first embodiment. The first embodiment requires ($c_l r_l$+

$c_h r_h$) product-sum calculations per pixel. This embodiment requires $(c_l+i)(r_l+i)$ product-sum calculations from the equation $(x_p=Ty_p)$. In most cases, since $(c_l+i)(r_l+i)<(c_l r_l+c_h r_h)$, the calculation cost can be reduced. For example, when $w_l=720$, $h_l=480$, $w_h=1920$, $h_h=1080$, and $i=4$, since $c_l=3$, $r_l=4$, $c_h=8$, and $r_h=9$, $(c_l+i)(r_l+i)=56$, and $c_l r_l+c_h r_h=84$. Hence, the calculation volume can be further reduced compared to the first embodiment. When resolution increasing is applied not simultaneously vertically and horizontally but independently in these directions, the calculation cost can be further reduced. FIG. 15 shows an example of a state in which the resolution increasing is independently applied vertically and horizontally. In this example, $w_l=720$, $h_l=480$, $w_h=1920$, $h_h=1080$, and $i=4$. In the example of FIG. 15, two pixels each protrude from 3×4 and 3×9 blocks. The protrusion amount is determined by i specified depending on the interpolation manner. The example of FIG. 15 is the case of the interpolation manner of i=4 (bicubic manner, cubic convolution manner, or the like). For example, when a bilinear manner of i=2 is used as the interpolation manner, one pixel each protrudes from 3×4 and 3×9 blocks.

(2-2) First Modification

Modification of Generation Method of High-Resolution Block

As in the first modification of the first embodiment in (1-5), a high-resolution block that does not satisfy the reconstruction constraint may be calculated. For example, T may be given by:

$$T=\alpha S+(I-\alpha W^+W)C.$$

Alternatively, by exploiting S that satisfies $Sy_p=(W^TW+\beta D^TD)^{-1}W^Ty$, T may be given by:

$$T=S+(I-W^+W)C.$$

Alternatively, by exploiting S that satisfies $Sy_p=(W^TW+\beta D^TD)^{-1}W^Ty$, T may be given by:

$$T=\alpha S+(I-\alpha W^+W)C.$$

As a result, the same effect as in (1-5) can be obtained.

(2-3) Second Modification

Modification Added with Emphasis Unit

Figure 11:
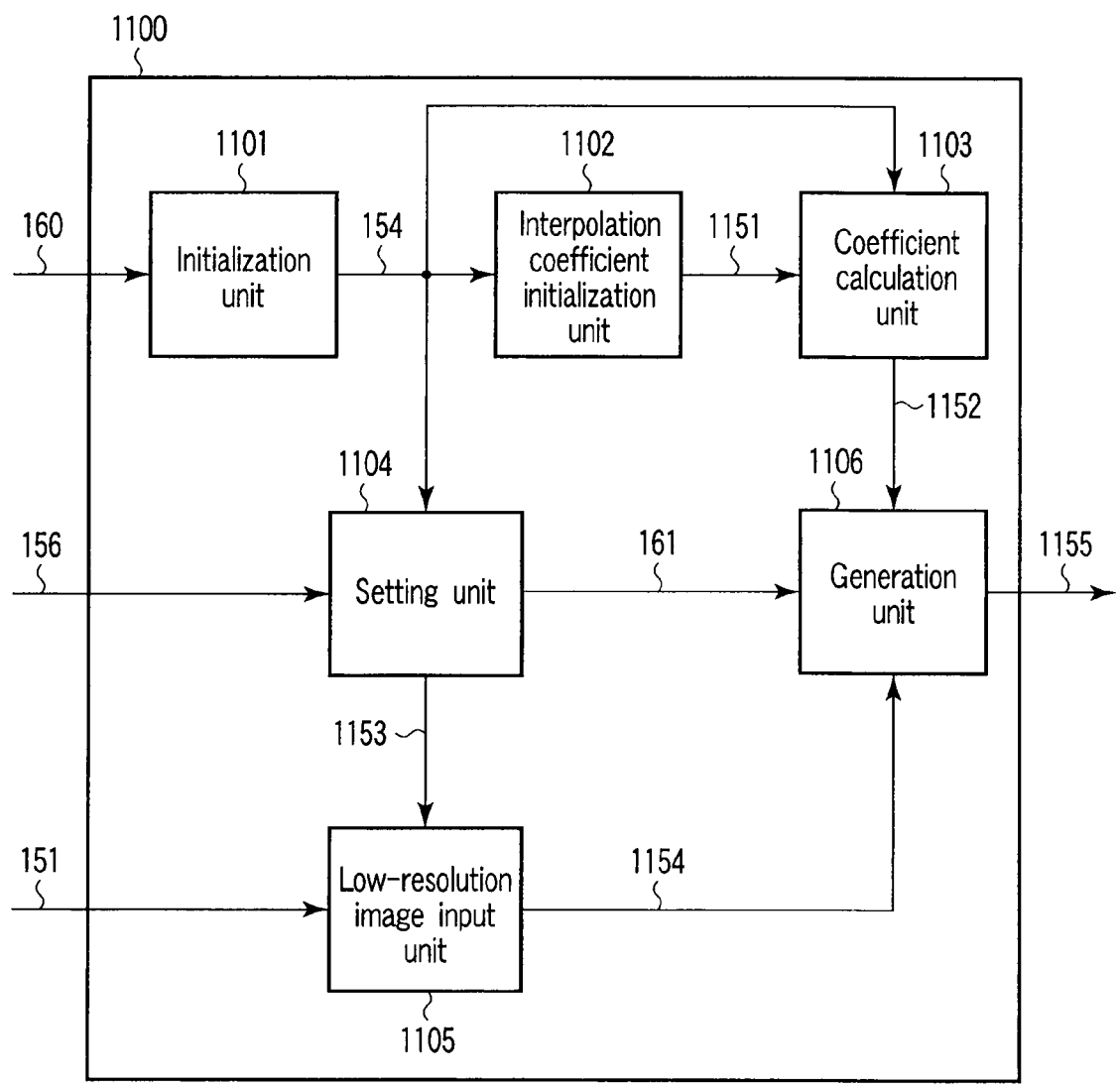
FIG. 11 is a block diagram of an image resolution increasing apparatus according to the second embodiment.
Figure 12:
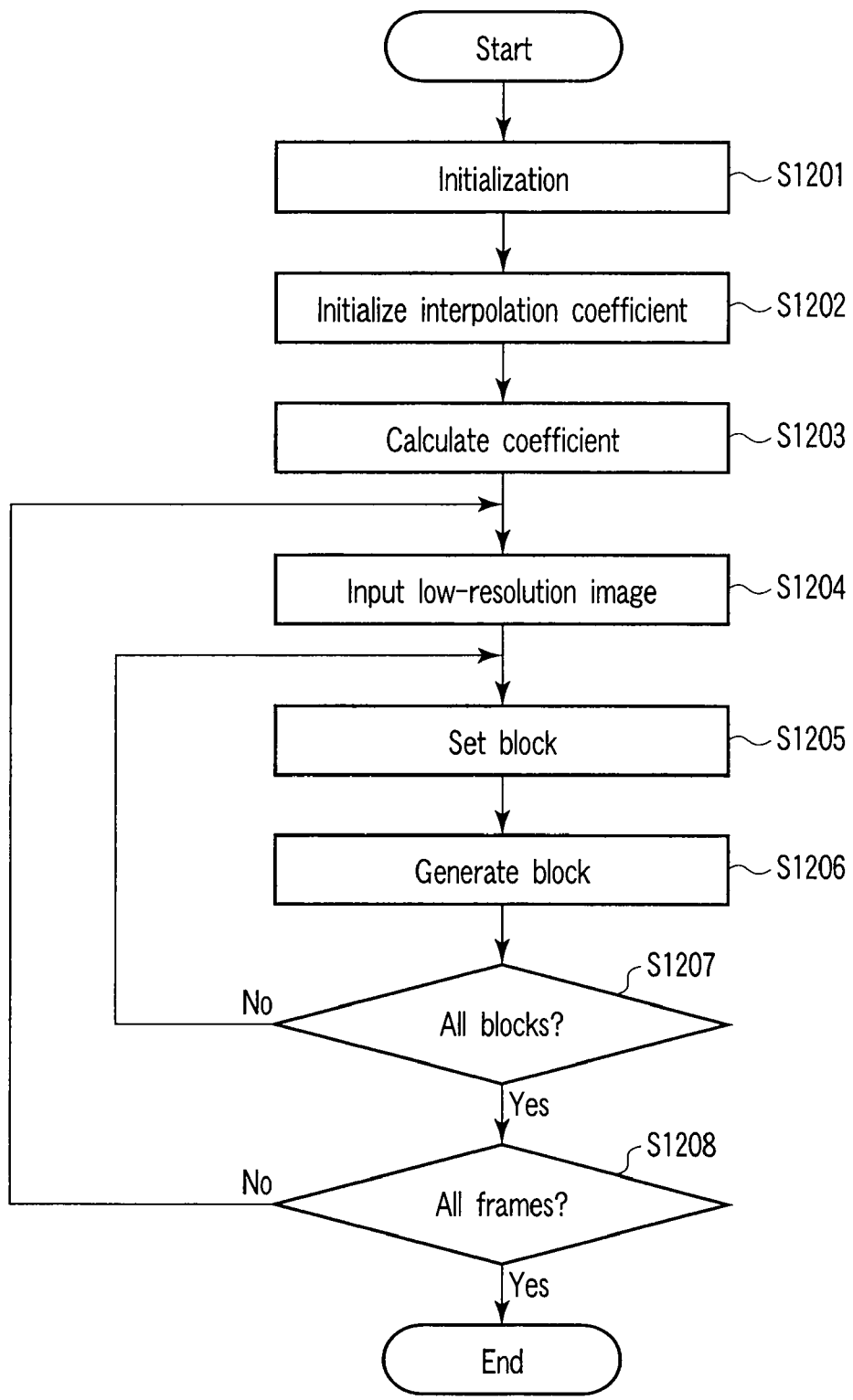
FIG. 12 is a flowchart showing an example of the operation of the image resolution increasing apparatus shown in FIG. 11.

In this embodiment, the processing sequence is FIG. 12, and the arrangement is FIG. 11. By contrast, the arrangement may be changed to FIG. 16, and the processing sequence may be changed to FIG. 17. Only changes will be described. In this modification, step S1401 is added to the processing sequence, and an emphasis unit 1601 is added to the arrangement.

The emphasis unit 1601 acquires the low-resolution image 151 as image data 551, and acquires the block data 1153 from the setting unit 1104. The emphasis unit 1601 extracts a low-resolution block 155 indicated by the block data 1153, applies emphasis processing to this low-resolution block 155, and passes an emphasized block 1651 to the generation unit 1106. As the emphasis processing, for example, an unsharp mask or Laplacian filter is applied.

Figure 16:
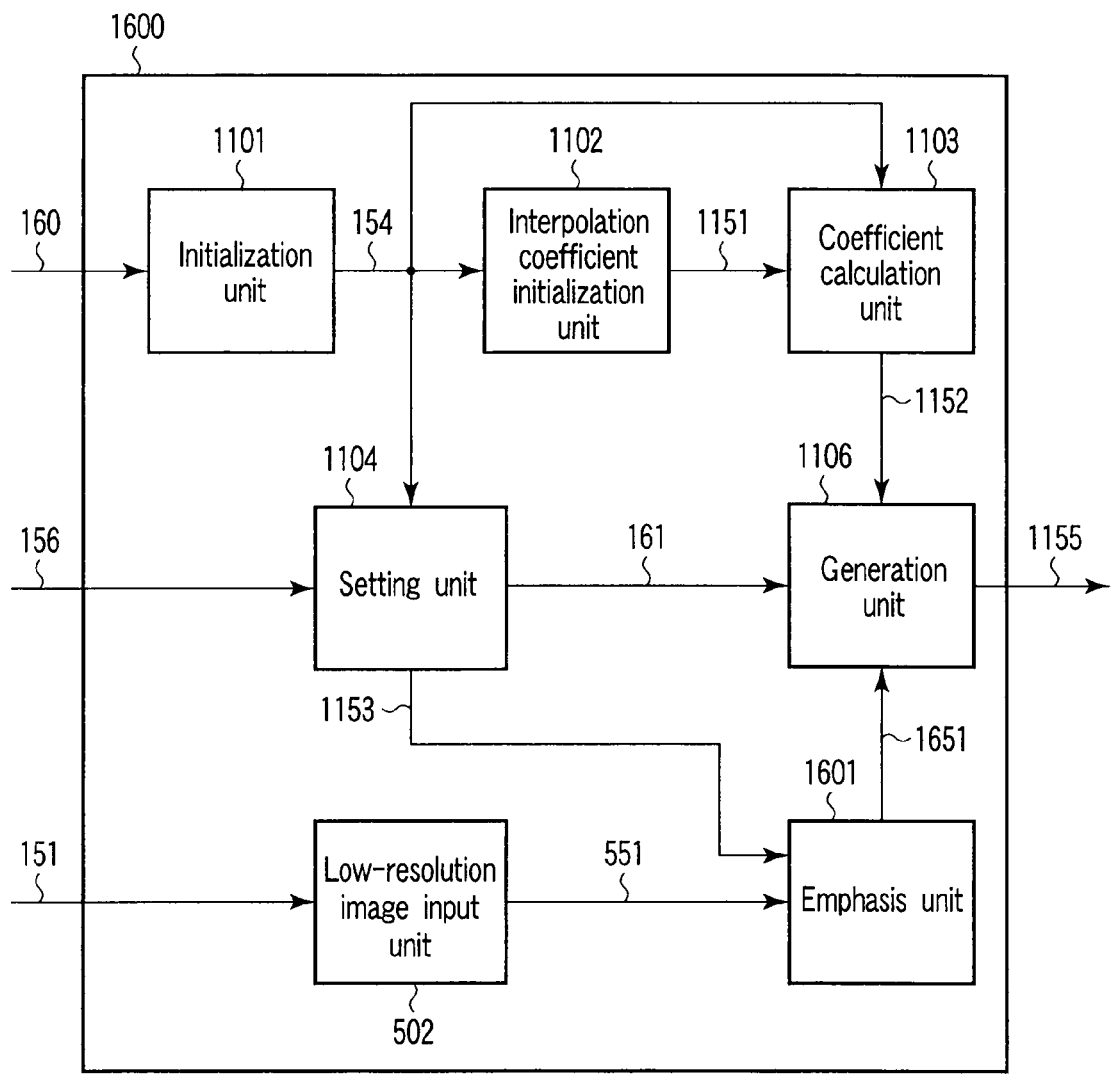
FIG. 16 is a block diagram of an image resolution increasing apparatus according to the second modification of the second embodiment.
Figure 17:
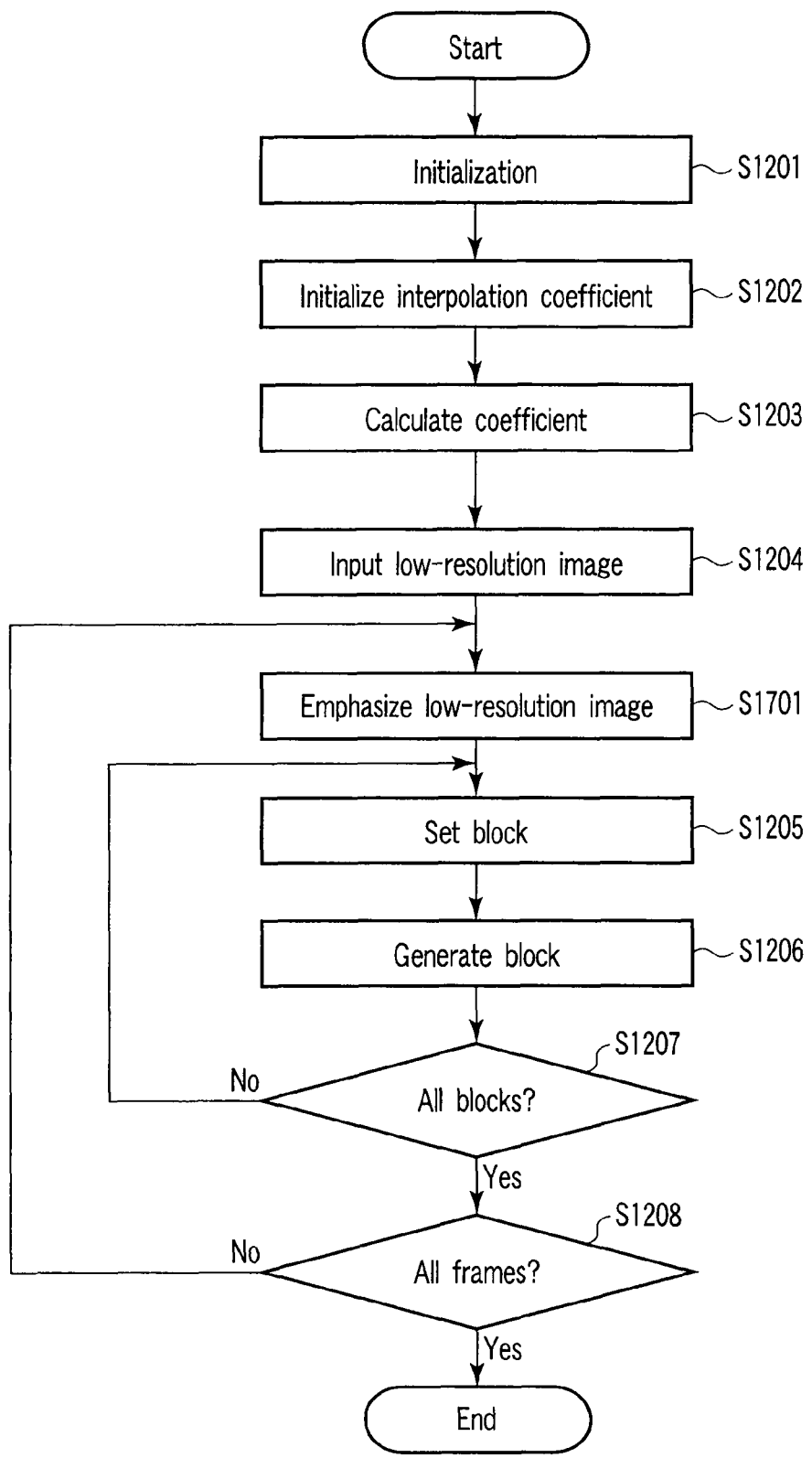
FIG. 17 is a flowchart showing an example of the operation of the image resolution increasing apparatus shown in FIG. 16.

An example of the operation of an image resolution increasing apparatus 1600 shown in FIG. 16 will be described below with reference to FIG. 17.

(S1204) In addition to the aforementioned processing, a low-resolution image input unit 502 outputs image data 551, and sends it to the emphasis unit 1601. The image data 551 is obtained by arranging pixel values of the low-resolution image 151. Therefore, if the low-resolution image 151 is not encoded, the image data 551 is the low-resolution image 151 itself; otherwise, the image data 551 is obtained by decoding the low-resolution image 151.

(S1401) An emphasis image is generated by applying the emphasis processing to the image data 551. As the emphasis processing, for example, an unsharp mask or Laplacian filter is applied.

(S1205) The setting unit 1103 sends the block data 1153 of the second embodiment to the emphasis unit 1601 in this modification in place of the low-resolution image input unit 1105. The emphasis unit 1601 sends the low-resolution block 1651 in the emphasized image, which is indicated by the block data 1153, to the generation unit 1106 in place of the operation of the second embodiment in which the low-resolution image input unit 1105 sends the low-resolution block 1154 in the low-resolution image 151, which is indicated by the block data 1153, to the generation unit 1106.

In this modification, a low-resolution image is emphasized, and an increased resolution image which becomes an emphasized low-resolution image if it is reduced in resolution is generated. In this way, a sharper increased resolution image can be generated.

(2-4) Third Modification

Modification Associated with Coefficient Calculation Unit 1103

The coefficient calculation unit 1103 may be changed to calculate the coefficient matrix T (coefficient data 1152) by exploiting S that satisfies $Sy_p=W^+Ey$. Note that j is, for example, 2, and E is a matrix of $c_l r_l$ rows×$(c_l+j)(r_l+j)$ columns. The matrix E is an emphasis matrix which converts a $(c_l+j)\times(r_l+j)$ low-resolution block into a low-resolution block in which central $c_l\times r_l$ pixels are emphasized by applying a 3×3 emphasis filter (unsharp mask or Laplacian filter). With this change, without adding any emphasis unit unlike in the second modification of (2-3), an increased resolution image which becomes an emphasized low-resolution image by reduced resolution can be generated. With this change, a sharper increased resolution image can be generated.

(2-5) Fourth Modification

Modification Under Assumption of Another Process of Reduced Resolution

In the second embodiment, the process of reduced resolution is given by:

$$y=Wx.$$

By contrast, as in the fifth modification of the first embodiment in (1-9), additive noise may be considered, and the process of reduced resolution may be expressed by:

$$y=Wx+n.$$

In this case, it may be changed to calculate the coefficient matrix T (coefficient data 1152) by exploiting S that satisfies $Sy_p=V^+W^*U^+y$. In this way, the same effect as in (1-9) can be obtained.

(2-6) Fifth Modification

Modification Under Assumption of Still Another Process of Reduced Resolution

As in the sixth modification of the first embodiment in (1-10), the process of reduced resolution (reconstruction constraint) may also be described by:

$$y=ABx$$

where a high-resolution block x is a $((c_h+b)(r_h+b))$-dimensional column vector, B is a matrix of $c_h r_h$ rows×$(c_h+b)(r_h+b)$ columns, and A is a matrix of $c_l r_l$ rows×$c_h r_h$ columns. If we have:

W=AB, the process of reduced resolution (reconstruction constraint) can be expressed by:

y=Wx.

Hence, the problem can be handled using the same equation as that when this change is not applied. Therefore, in the coefficient matrix T (coefficient data 1152), a part associated with W in the equation (T=S+(I−W+W)C)) may be substituted. However, as in (1-10), note that the block sizes of the high-resolution block x and low-resolution block y are different, and the reduced resolution matrix W has a different size.

(2-7) Sixth Modification

Modification of Calculation of Coefficient Data 1152 in Advance

Figure 18:
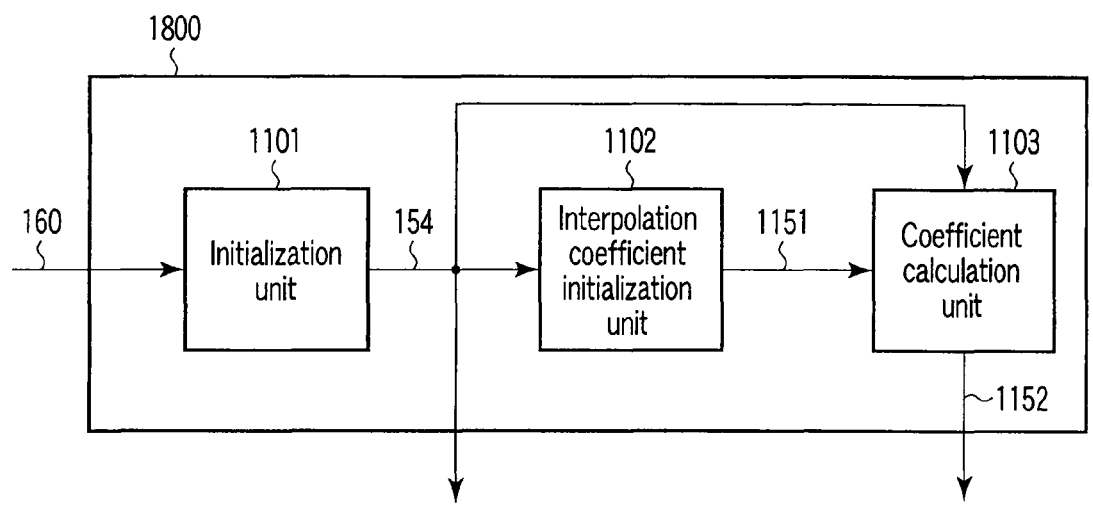
FIG. 18 is a block diagram of a coefficient calculation apparatus included in an image resolution increasing apparatus according to the sixth modification of the second embodiment.
Figure 19:
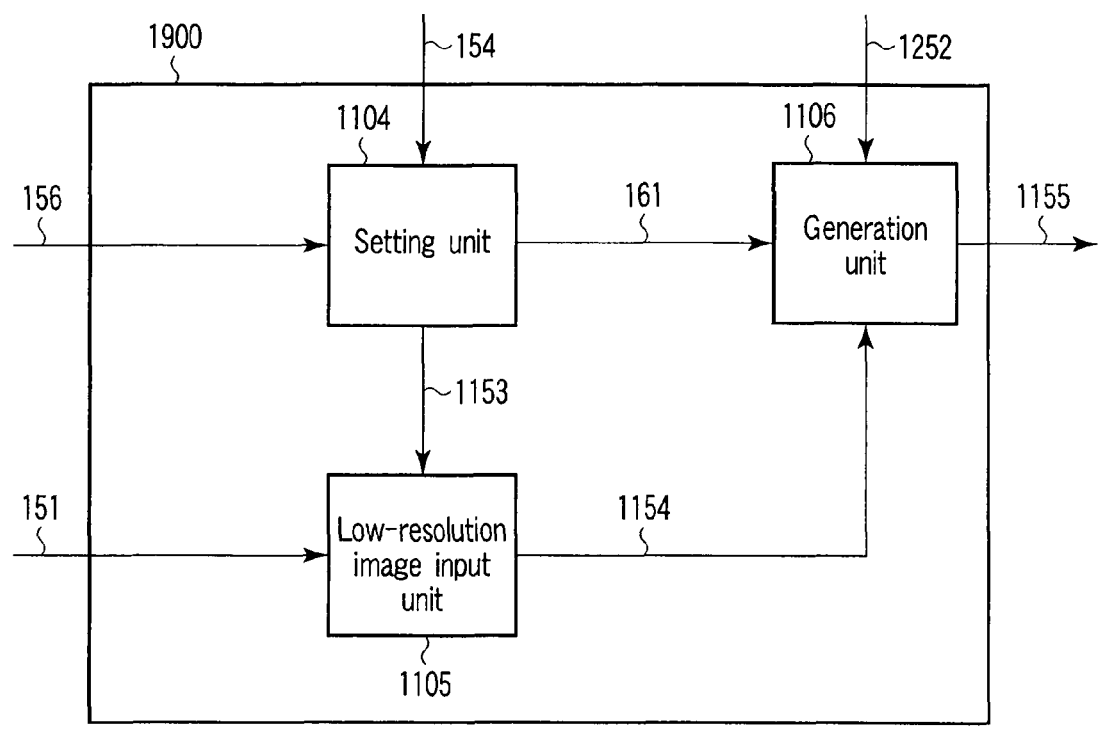
FIG. 19 is a block diagram of a resolution increasing calculation apparatus included in the image resolution increasing apparatus according to the sixth modification of the second embodiment.

If a resolution increasing ratio is determined in advance, the coefficient data 1152 may be calculated in advance. In this case, the image resolution increasing apparatus 1100 shown in FIG. 11 may be divided into two apparatuses: a coefficient calculation apparatus 1800 shown in FIG. 18 and a resolution increasing calculation apparatus 1900 shown in FIG. 19. For example, when the image resolution increasing apparatus 1100 of this embodiment is applied to a television, one of facilities required to manufacture televisions in a factory is the coefficient calculation apparatus 1800, and one of components equipped in each television is the resolution increasing calculation apparatus 1900. In this case, steps S1201 to S1203 in FIG. 12 are the processes in the coefficient calculation apparatus 1800, and steps S1204 to S1208 are the processes in the resolution increasing calculation apparatus 1900. As a result, since the resolution increasing calculation apparatus 1900 need not calculate the coefficient data 1152, the calculation cost can be reduced.

According to the aforementioned embodiment, since the processing is done for respective blocks and the numbers of multiplications and additions required to calculate the pixel value of one pixel in a high-resolution image are reduced, the calculation cost can be reduced. Since the size of the reduced resolution matrix is small, the cost required to calculate a Moore-Penrose generalized inverse matrix of the reduced resolution matrix is reduced. Furthermore, any likelihood based on the assumption that a differential image conforms to the Laplace distribution need not be maximized.

The image resolution increasing apparatus of this embodiment can be used to provide a function of increasing the image quality to electronic apparatuses having functions of recording, displaying, and printing images such as a personal computer, digital camera, video camera, portable phone, portable information terminal, printer, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image resolution increasing method, comprising:
   inputting a low-resolution image having a first size as a size that indicates the numbers of pixels arranged vertically and horizontally;
   inputting a high-resolution image obtained by increasing in resolution the low-resolution image to a second size by an interpolation manner or a super-resolution manner, the second size being a desired size of a first image finally generated;
   calculating a first block size corresponding to the first size and a second block size corresponding to the second size in accordance with the first size and the second size;
   setting a first position of a block of the first block size in the low-resolution image, and a second position of a block of the second block size in the high-resolution image or the first image, the second position corresponding to the first position;
   setting a first block which is included in the low-resolution image and is located at the first position, and a second block which is included in the high-resolution image and is located at the second position;
   setting, as an increased resolution block of the first block, a third block expressed by a second vector obtained by projecting a first vector representing the second block to a linear manifold as a set of vectors that indicate fourth blocks of the second block size, the fourth blocks becoming the first block due to reduced resolution, in a Euclidean space having, as the number of dimensions, a product of the number of pixels arranged vertically in the second block size and the number of pixels arranged horizontally in the second block size to obtain a plurality of increased resolution blocks; and
   generating the first image using at least one of the increased resolution blocks set by changing the first position and the second position.

2. The method according to claim 1, wherein calculating the first block size calculates the first block size and the second block size based on a resolution increasing ratio from the low-resolution image to the first image.

3. The method according to claim 1, further comprising emphasizing the low-resolution image.

4. An image resolution increasing method, comprising:
   inputting a low-resolution image having a first size as a size that indicates the numbers of pixels arranged vertically and horizontally;
   inputting a high-resolution image obtained by increasing in resolution the low-resolution image to a second size by an interpolation manner or a super-resolution manner, the second size being a desired size of a first image finally generated;
   calculating a first block size corresponding to the first size and a second block size corresponding to the second size in accordance with the first size and the second size;
   setting a first position of a block of the first block size in the low-resolution image, and a second position corresponding to the first position of the second block size in the high-resolution image or the first image;
   setting a first block which is included in the low-resolution image and is located at the first position, and a second block which is included in the high-resolution image and is located at the second position;
   setting, as an increased resolution block of the first block, a third block expressed by a vector corresponding to points on a straight line that passes through two points indicated by a first vector and a second vector, the first vector representing the second block, the second vector being obtained by projecting the first vector to a linear manifold as a set of vectors that indicate fourth blocks of the second block size, the fourth blocks becoming the first block due to reduced resolution, in a Euclidean space having, as the number of dimensions, a product of the number of pixels arranged vertically in the second block size and the number of pixels arranged horizontally in the second block size to obtain a plurality of increased resolution blocks; and generating the first image using at least one of the increased resolution blocks set by changing the first position and the second position.

5. The method according to claim 1, wherein when a plurality of increased resolution blocks based on the third block overlap each other, average values of pixel values between overlapping blocks are adopted as pixel values of the overlapping parts.

6. An image resolution increasing method, comprising:
calculating a first block size corresponding to a first size and a second block size corresponding to a second size in accordance with the first size and the second size, the first size being a size of a low-resolution image and a size that indicates the numbers of pixels arranged vertically and horizontally, the second size being a desired size of a first image finally generated;
setting a first position of a block of the first block size in the low-resolution image, and a second position of a block of the second block size in the first image, the second position corresponding to the first position;
setting a first block which is included in the low-resolution image and is located at the first position;
calculating, using the first block size and the second block size, a first coefficient used to generate a second block of the second block size by an interpolation manner from the first block;
calculating, using the first coefficient, the first block size, and the second block size, a second coefficient used to calculate a second vector obtained by projecting a first vector indicating the second block to a linear manifold as a set of vectors that indicate third blocks of the second block size, the third blocks becoming a part of the first block due to reduced resolution, in a Euclidean space having, as the number of dimensions, a product of the number of pixels arranged vertically in the second block size and the number of pixels arranged horizontally in the second block size;
calculating the second vector corresponding to a position indicated by the second position from the first block and the second coefficient, setting a fourth block indicated by the second vector to an increased resolution block as a part of the first block to obtain a plurality of increased resolution blocks; and
generating the first image using at least one of the increased resolution blocks set by changing the first position and the second position.

7. The method according to claim 6, wherein calculating the first block size calculates the first block size and the second block size based on a resolution increasing ratio from the low-resolution image to the first image.

8. The method according to claim 6, further comprising emphasizing the low-resolution image.

9. An image resolution increasing method, comprising:
calculating a first block size corresponding to a first size and a second block size corresponding to a second size in accordance with the first size and the second size, the first size being a size of a low-resolution image and a size that indicates the numbers of pixels arranged vertically and horizontally, the second size being a desired size of a first image finally generated;
setting a first position of a block of the first block size in the low-resolution image, and a second position of a block of the second block size in the first image, the second position corresponding to the first position;
setting a first block which is included in the low-resolution image and is located at the first position;
calculating, using the first block size and the second block size, a first coefficient used to generate a second block of the second block size by an interpolation manner from the first block;
calculating, using the first coefficient, the first block size, and the second block size, a second coefficient used to calculate a second vector obtained by projecting a first vector indicating the second block to a linear manifold as a set of vectors that indicate third blocks of the second block size, the third blocks becoming a part of the first block due to reduced resolution, in a Euclidean space having, as the number of dimensions, a product of the number of pixels arranged vertically in the second block size and the number of pixels arranged horizontally in the second block size;
calculating the second vector corresponding to a position indicated by the second position from the first block and the second coefficient;
setting, as an increased resolution block as a part of the first block, a fourth block expressed by a vector corresponding to points on a straight line that passes through two points indicated by the first vector and the second vector to obtain a plurality of increased resolution blocks; and
generating the first image using at least one of the increased resolution blocks set by changing the first position and the second position.

10. The method according to claim 6, wherein when a plurality of increased resolution blocks based on the fourth blocks overlap each other, average values of pixel values between overlapping blocks are adopted as pixel values of the overlapping parts.

11. An image resolution increasing apparatus, comprising:
a first input unit configured to input a low-resolution image having a first size as a size that indicates the numbers of pixels arranged vertically and horizontally;
a second input unit configured to input a high-resolution image obtained by increasing in resolution the low-resolution image to a second size by an interpolation manner or a super-resolution manner, the second size being a desired size of a first image finally generated;
a calculation unit configured to calculate a first block size corresponding to the first size and a second block size corresponding to the second size in accordance with the first size and the second size;
a first setting unit configured to set a first position of a block of the first block size in the low-resolution image, and a second position of a block of the second block size in the high-resolution image or the first image, the second position corresponding to the first position;
a second setting unit configured to set a first block which is included in the low-resolution image and is located at the first position, and a second block which is included in the high-resolution image and is located at the second position;
a third setting unit configured to set, as an increased resolution block of the first block, a third block expressed by a second vector obtained by projecting a first vector representing the second block to a linear manifold as a set of vectors that indicate fourth blocks of the second block size, the fourth blocks becoming the first block due to reduced resolution, in a Euclidean space having, as the number of dimensions, a product of the number of pixels arranged vertically in the second block size and the number of pixels arranged horizontally in the second block size to obtain a plurality of increased resolution blocks; and a generation unit configured to generate the first image using at least one of the increased resolution blocks set by changing the first position and the second position.

12. The apparatus according to claim 11, wherein the calculation unit configured to calculate the first block size and the second block size based on a resolution increasing ratio from the low-resolution image to the first image.

13. The apparatus according to claim 11, further comprising an emphasis unit configured to emphasize the low-resolution image.

14. An image resolution increasing apparatus, comprising:
a first input unit configured to input a low-resolution image having a first size as a size that indicates the numbers of pixels arranged vertically and horizontally;
a second input unit configured to input a high-resolution image obtained by increasing in resolution the low-resolution image to a second size by an interpolation manner or a super-resolution manner, the second size being a desired size of a first image finally generated;
a calculation unit configured to calculate a first block size corresponding to the first size and a second block size corresponding to the second size in accordance with the first size and the second size;
a first setting unit configured to set a first position of a block of the first block size in the low-resolution image, and a second position corresponding to the first position of the second block size in the high-resolution image or the first image;
a second setting unit configured to set a first block which is included in the low-resolution image and is located at the first position, and a second block which is included in the high-resolution image and is located at the second position;
a third setting unit configured to set, as an increased resolution block of the first block, a third block expressed by a vector corresponding to points on a straight line that passes through two points indicated by a first vector and a second vector, the first vector representing the second block, the second vector being obtained by projecting the first vector to a linear manifold as a set of vectors that indicate fourth blocks of the second block size, the fourth blocks becoming the first block due to reduced resolution, in a Euclidean space having, as the number of dimensions, a product of the number of pixels arranged vertically in the second block size and the number of pixels arranged horizontally in the second block size to obtain a plurality of increased resolution blocks; and
a generation unit configured to generate the first image using at least one of the increased resolution blocks set by changing the first position and the second position.

15. The apparatus according to claim 11, wherein when a plurality of increased resolution blocks based on the third block overlap each other, average values of pixel values between overlapping blocks are adopted as pixel values of the overlapping parts.

16. An image resolution increasing apparatus, comprising:
a first calculation unit configured to calculate a first block size corresponding to a first size and a second block size corresponding to a second size in accordance with the first size and the second size, the first size being a size of a low-resolution image and a size that indicates the numbers of pixels arranged vertically and horizontally, the second size being a desired size of a first image finally generated;
a first setting unit configured to set a first position of a block of the first block size in the low-resolution image, and a second position of a block of the second block size in the first image, the second position corresponding to the first position;
a second setting unit configured to set a first block which is included in the low-resolution image and is located at the first position;
a second calculation unit configured to calculate, using the first block size and the second block size, a first coefficient used to generate a second block of the second block size by an interpolation manner from the first block;
a third calculation unit configured to calculate, using the first coefficient, the first block size, and the second block size, a second coefficient used to calculate a second vector obtained by projecting a first vector indicating the second block to a linear manifold as a set of vectors that indicate third blocks of the second block size, the third blocks becoming a part of the first block due to reduced resolution, in a Euclidean space having, as the number of dimensions, a product of the number of pixels arranged vertically in the second block size and the number of pixels arranged horizontally in the second block size;
a third setting unit configured to calculate the second vector corresponding to a position indicated by the second position from the first block and the second coefficient, and to set a fourth block indicated by the second vector to an increased resolution block as a part of the first block to obtain a plurality of increased resolution blocks; and
a generation unit configured to generate the first image using at least one of the increased resolution blocks set by changing the first position and the second position.

17. The apparatus according to claim 16, wherein the first calculation unit configured to calculate the first block size and the second block size based on a resolution increasing ratio from the low-resolution image to the first image.

18. The apparatus according to claim 16, further comprising an emphasis unit configured to emphasize the low-resolution image.

19. An image resolution increasing apparatus, comprising:
a first calculation unit configured to calculate a first block size corresponding to a first size and a second block size corresponding to a second size in accordance with the first size and the second size, the first size being a size of a low-resolution image and a size that indicates the numbers of pixels arranged vertically and horizontally, the second size being a desired size of a first image finally generated;
a first setting unit configured to set a first position of a block of the first block size in the low-resolution image, and a second position of a block of the second block size in the first image, the second position corresponding to the first position;
a second setting unit configured to set a first block which is included in the low-resolution image and is located at the first position;
a second calculation unit configured to calculate, using the first block size and the second block size, a first coefficient used to generate a second block of the second block size by an interpolation manner from the first block;
a third calculation unit configured to calculate, using the first coefficient, the first block size, and the second block size, a second coefficient used to calculate a second vector obtained by projecting a first vector indicating the second block to a linear manifold as a set of vectors that indicate third blocks of the second block size, the third blocks becoming a part of the first block due to reduced resolution, in a Euclidean space having, as the number of dimensions, a product of the number of pixels arranged vertically in the second block size and the number of pixels arranged horizontally in the second block size;

a fourth calculation unit configured to calculate the second vector corresponding to a position indicated by the second position from the first block and the second coefficient;

a third setting unit configured to set, as an increased resolution block as a part of the first block, a fourth block expressed by a vector corresponding to points on a straight line that passes through two points indicated by the first vector and the second vector to obtain a plurality of increased resolution blocks; and a generation unit generating the first image using at least one of the increased resolution blocks set by changing the first position and the second position.

20. The apparatus according to claim 16, wherein when a plurality of increased resolution blocks based on the fourth blocks overlap each other, average values of pixel values between overlapping blocks are adopted as pixel values of the overlapping parts.

* * * * *